Figure 1:
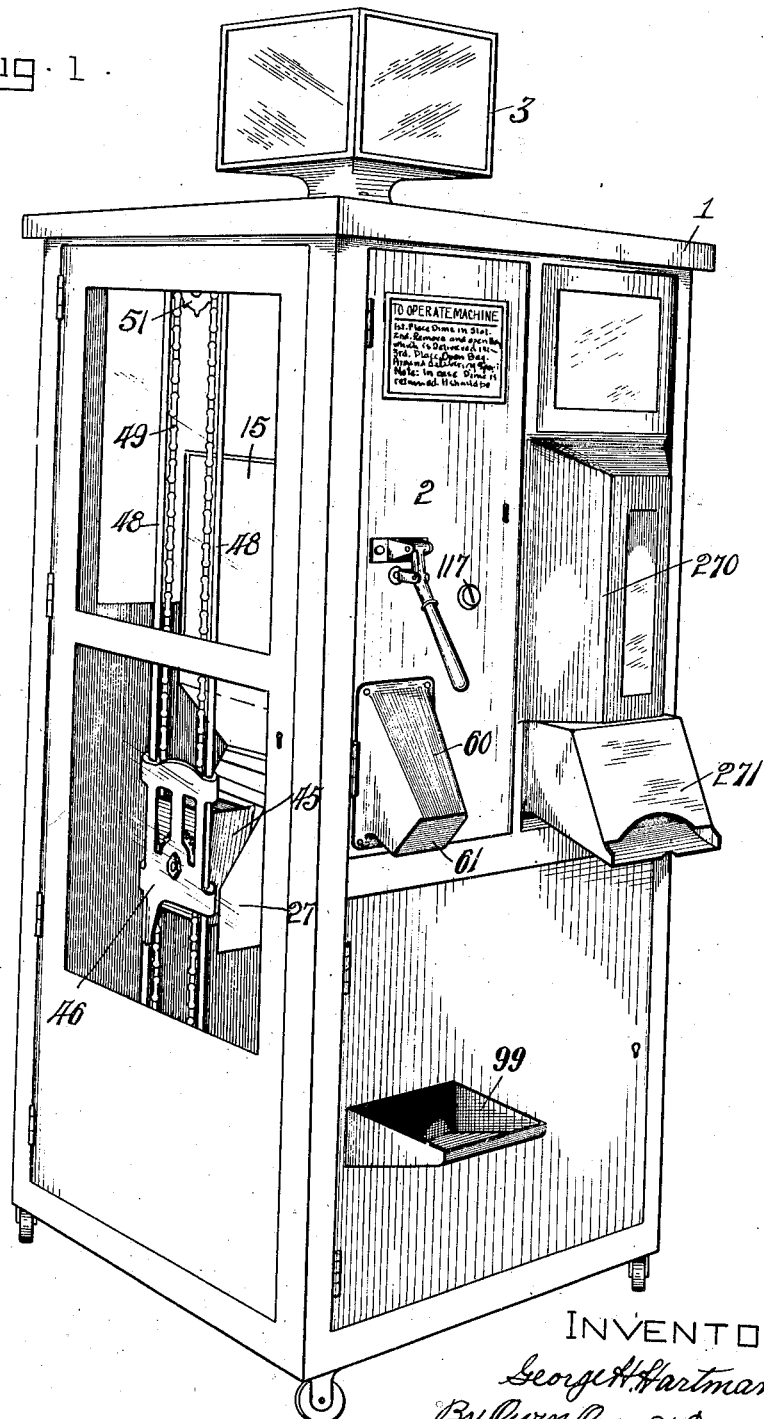

June 1, 1926.

G. H. HARTMAN 1,586,950

POP CORN VENDING MACHINE

Filed July 3, 1922 14 Sheets-Sheet 1

INVENTOR
George H. Hartman,
By Owen Owen & Crampton,
attys.

June 1, 1926.

G. H. HARTMAN 1,586,950

POP CORN VENDING MACHINE

Filed July 3, 1922    14 Sheets-Sheet 2

INVENTOR
George H. Hartman,
By Burn Burn & Crampton,
Attys.

June 1, 1926.  G. H. HARTMAN  1,586,950
POP CORN VENDING MACHINE
Filed July 3, 1922  14 Sheets-Sheet 3

INVENTOR
George H. Hartman,
By Owen Owen & Crampton
Attys.

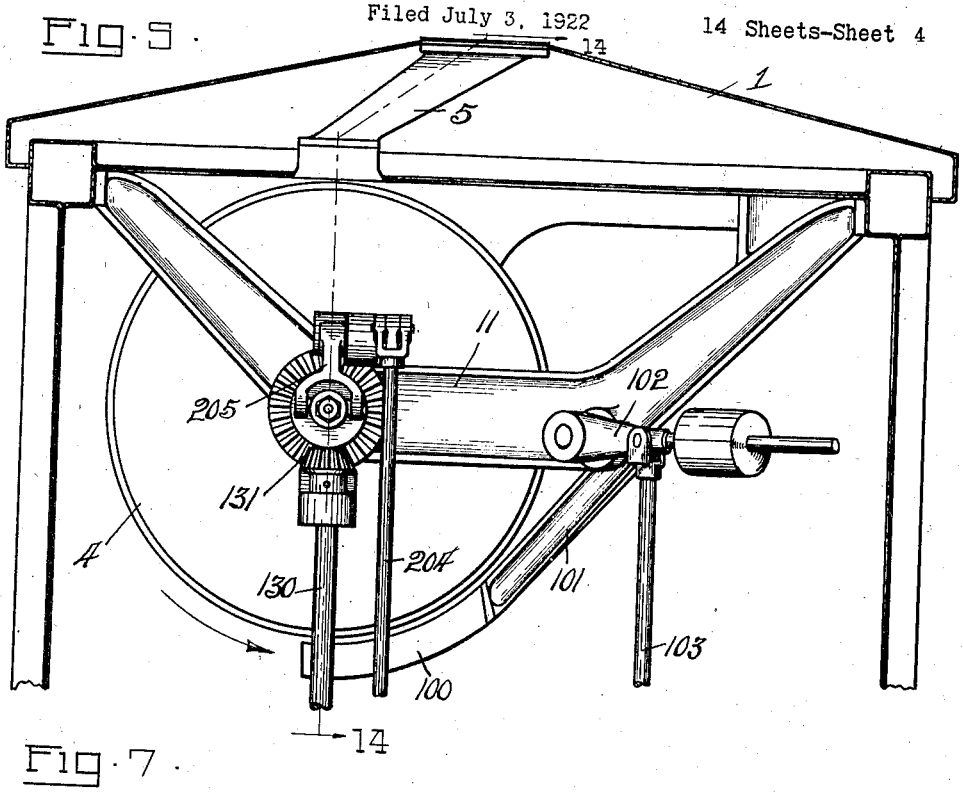
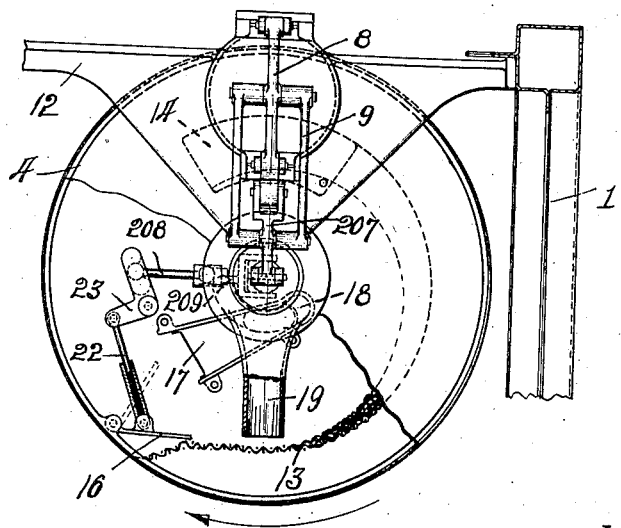

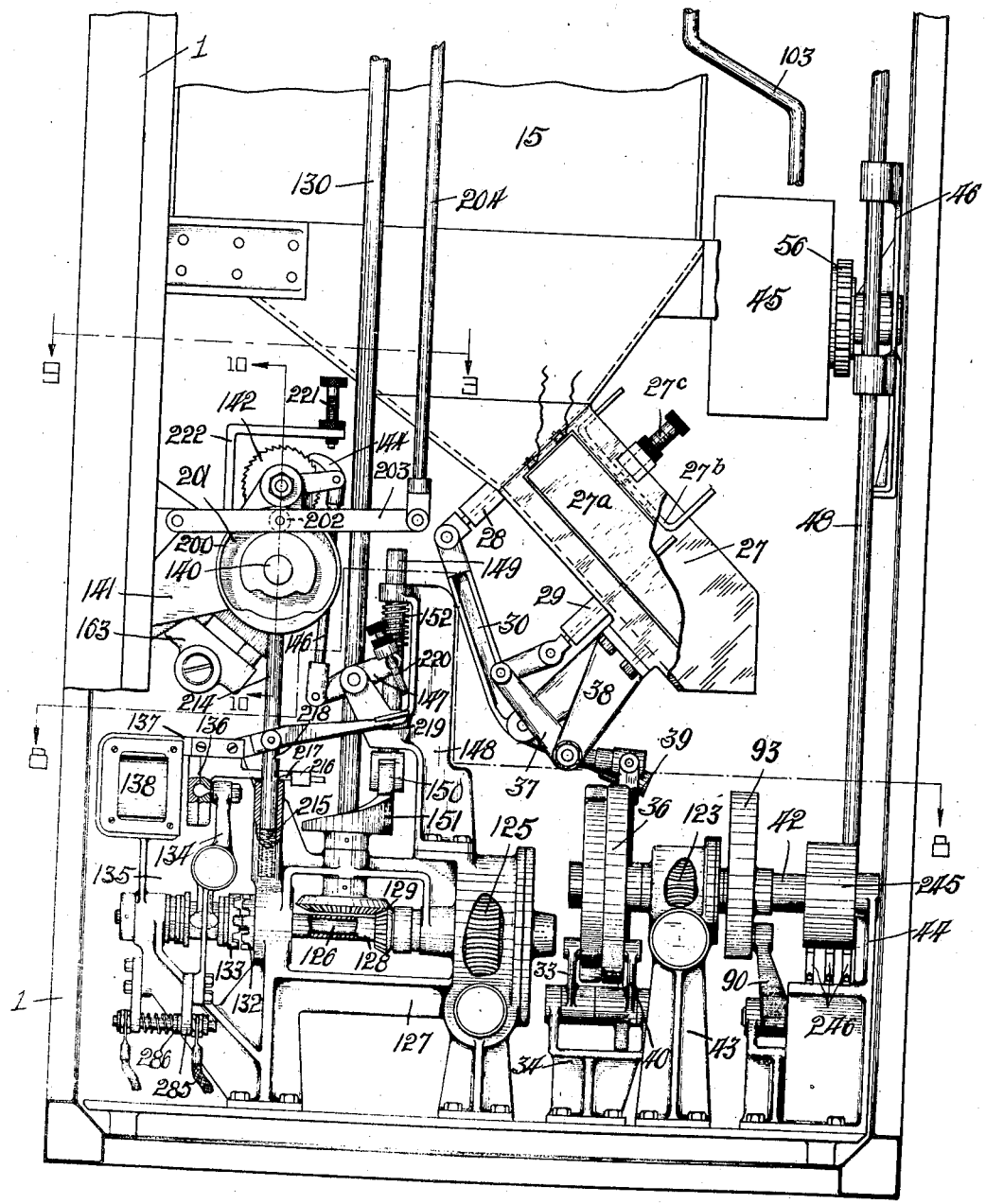

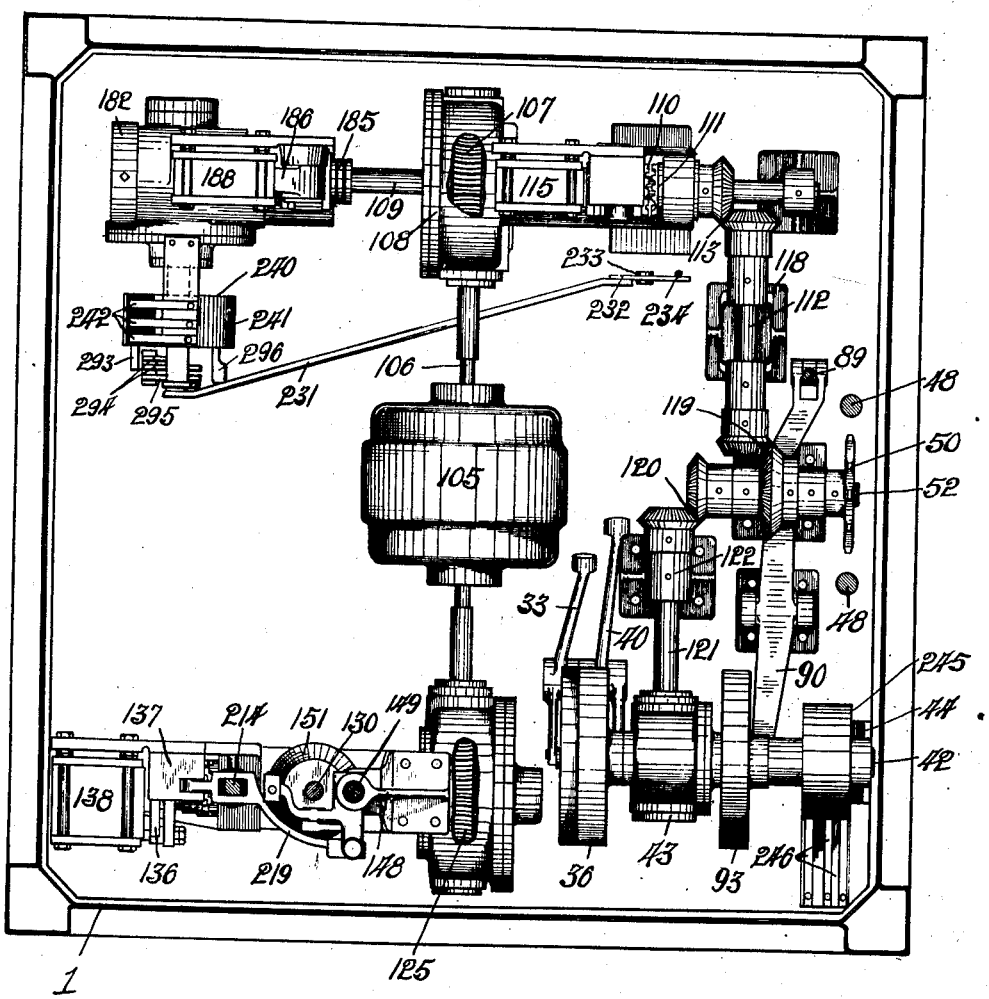

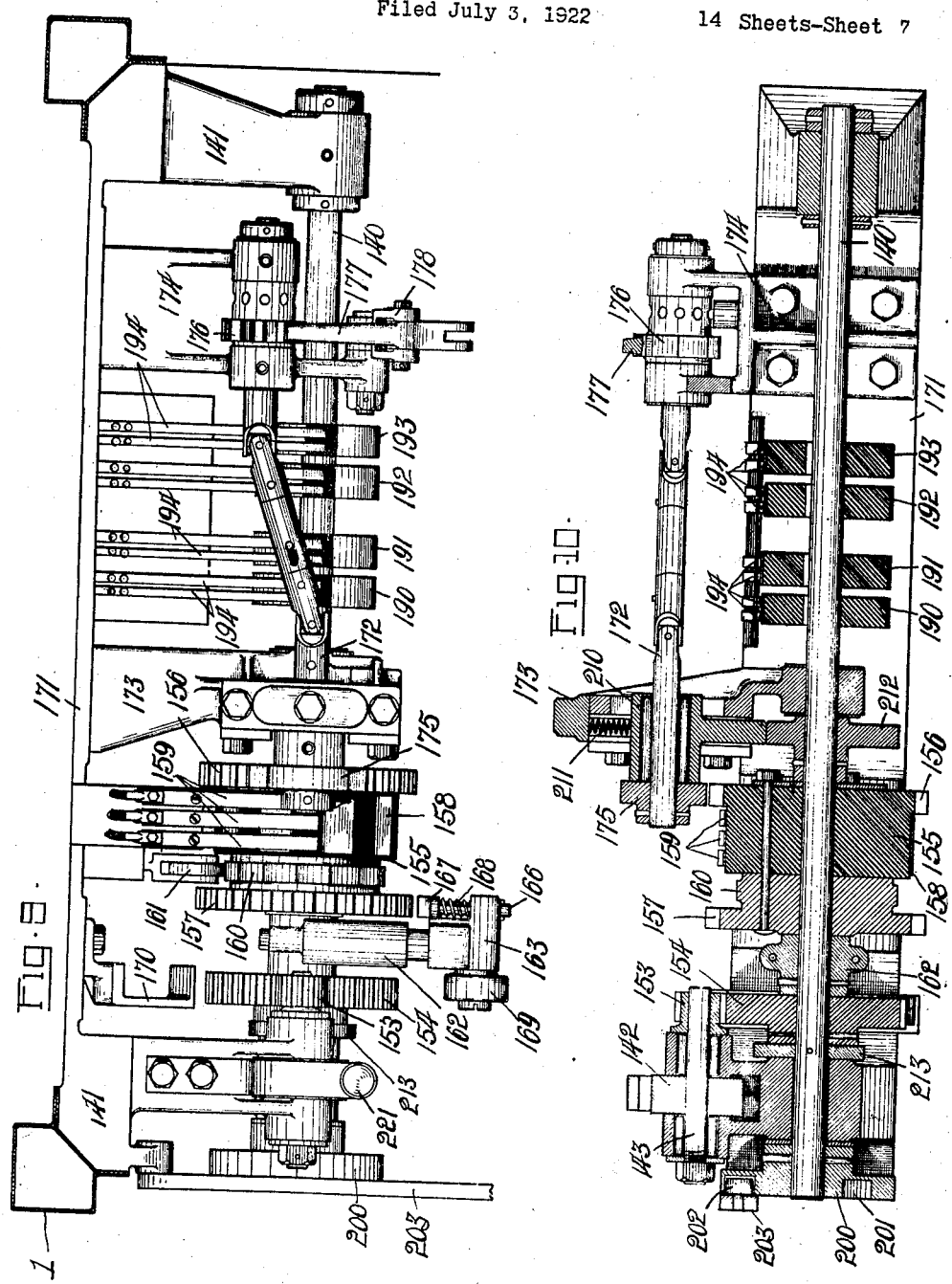

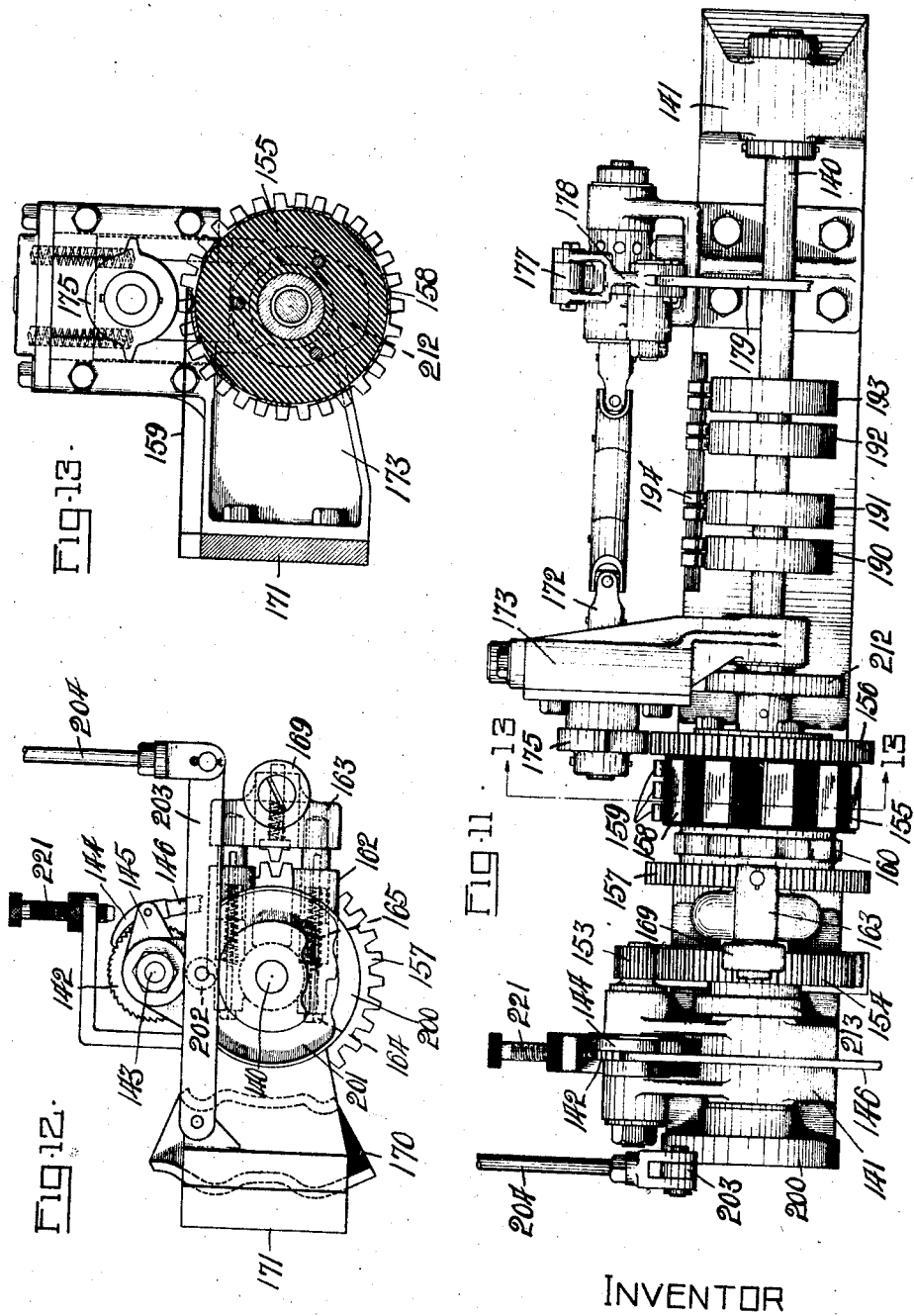

June 1, 1926.

G. H. HARTMAN 1,586,950

POP CORN VENDING MACHINE

Filed July 3, 1922

14 Sheets-Sheet 9

INVENTOR
George H Hartman,
By Owen Owen & Crompton.
Attys.

June 1, 1926.
G. H. HARTMAN
POP CORN VENDING MACHINE
Filed July 3, 1922
1,586,950
14 Sheets-Sheet 10
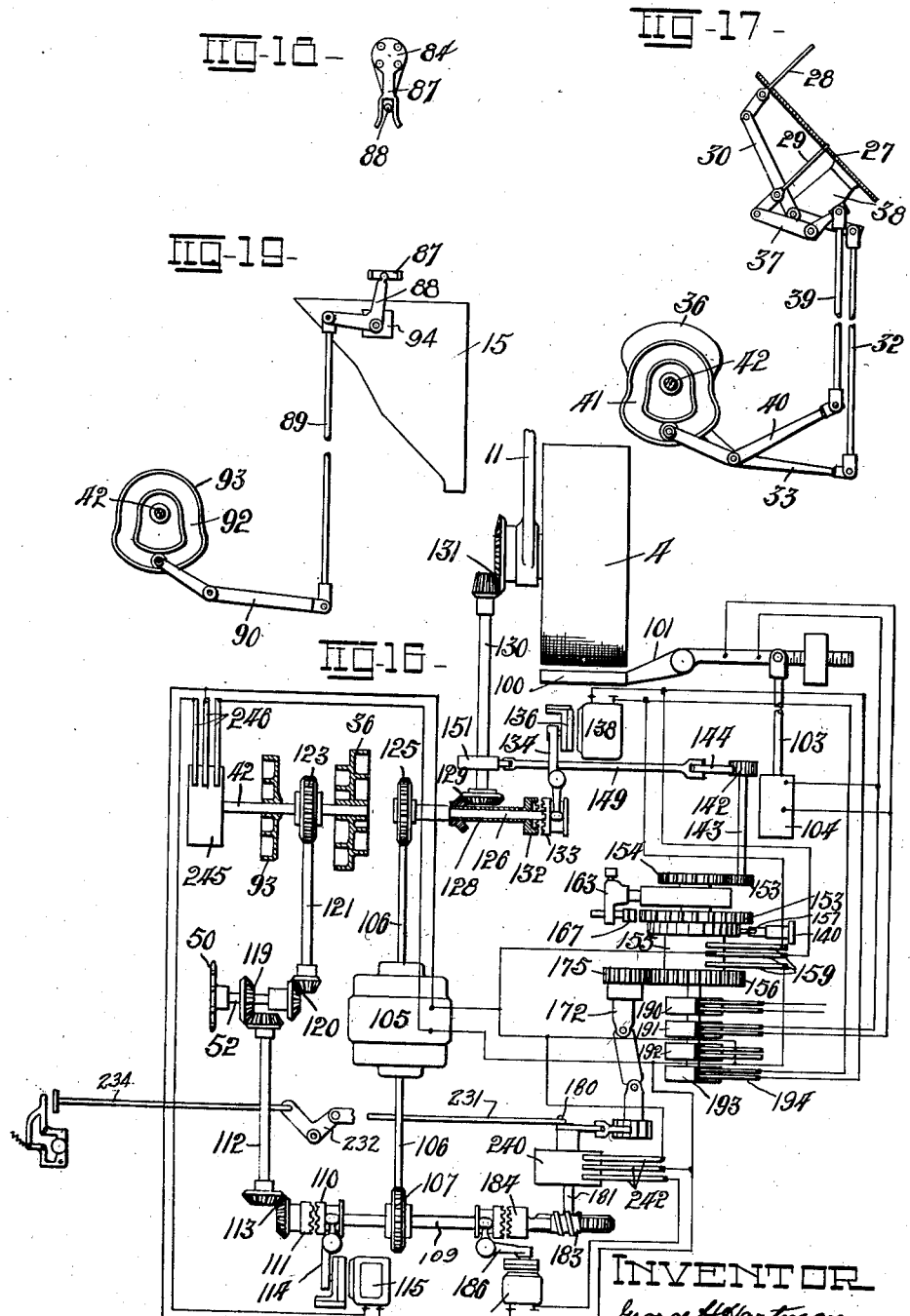

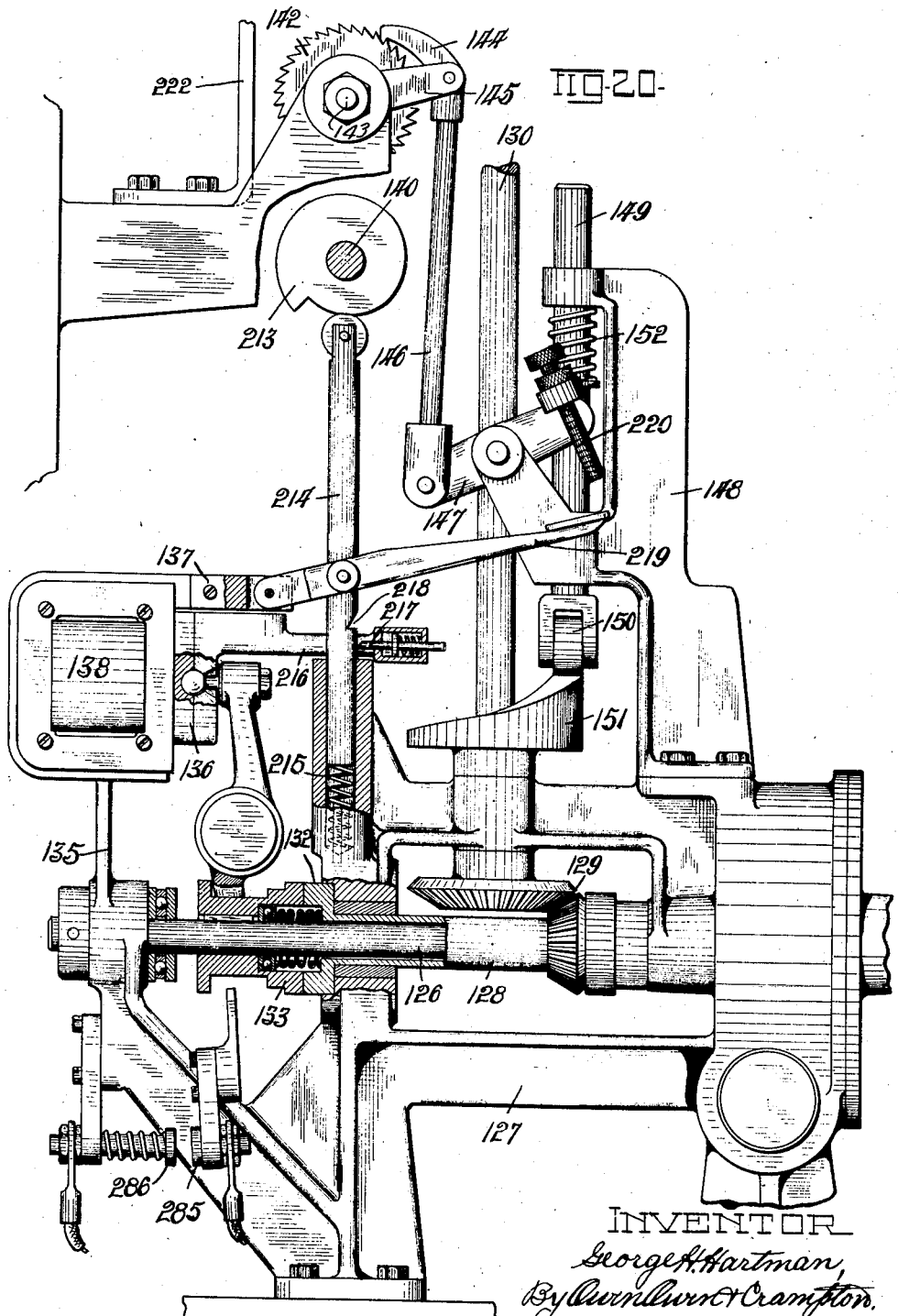

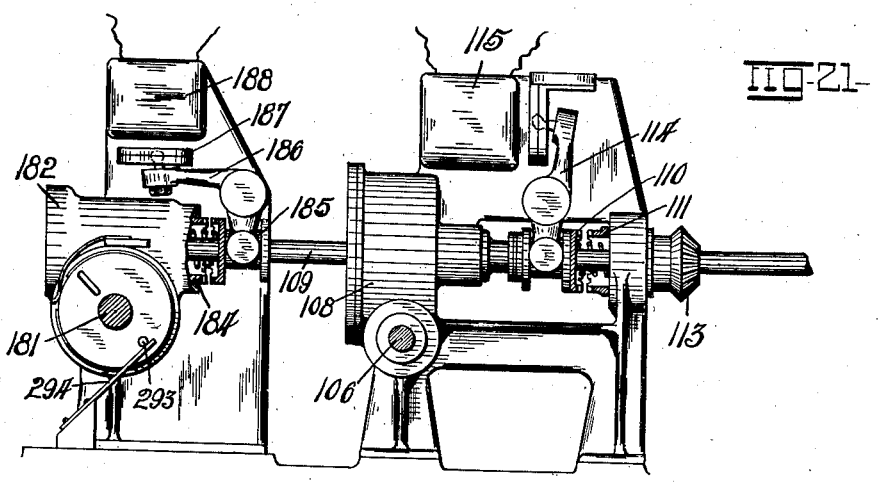
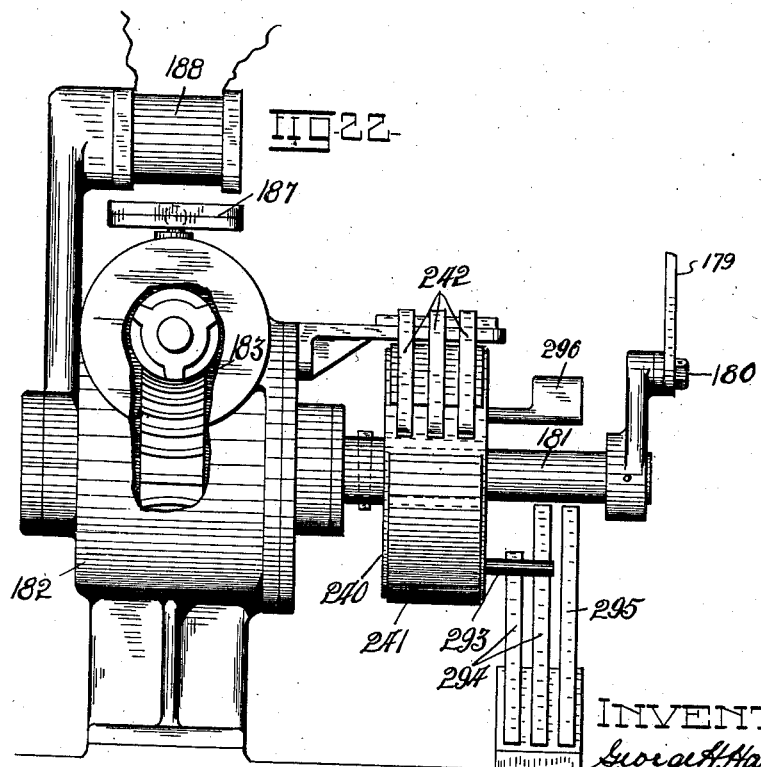

June 1, 1926.  
G. H. HARTMAN  
1,586,950  
POP CORN VENDING MACHINE  
Filed July 3, 1922    14 Sheets-Sheet 13
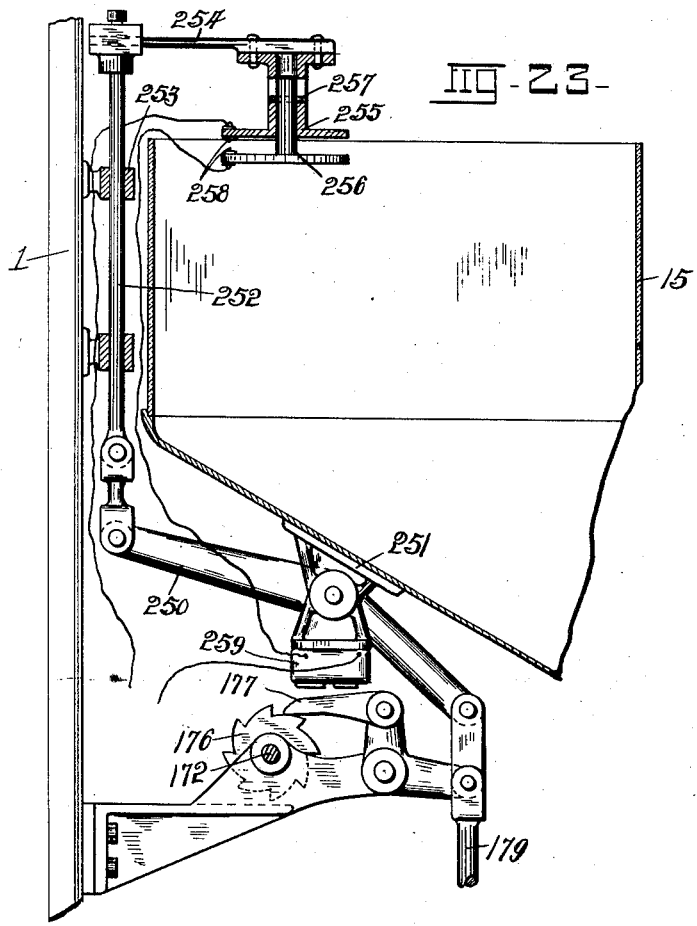
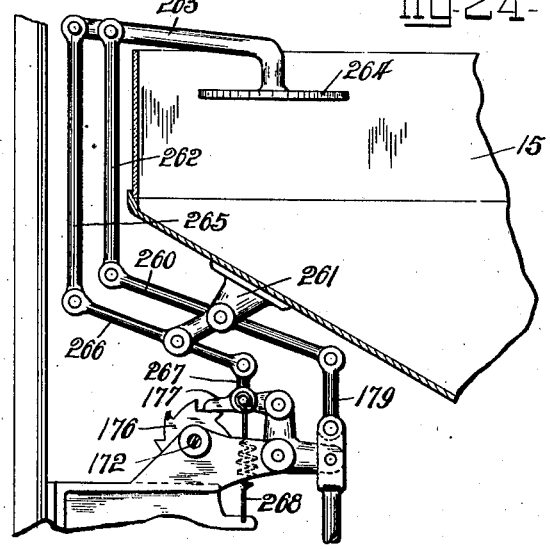
INVENTOR  
George H. Hartman,  
By Owen Owen & Crampton  
Attys.

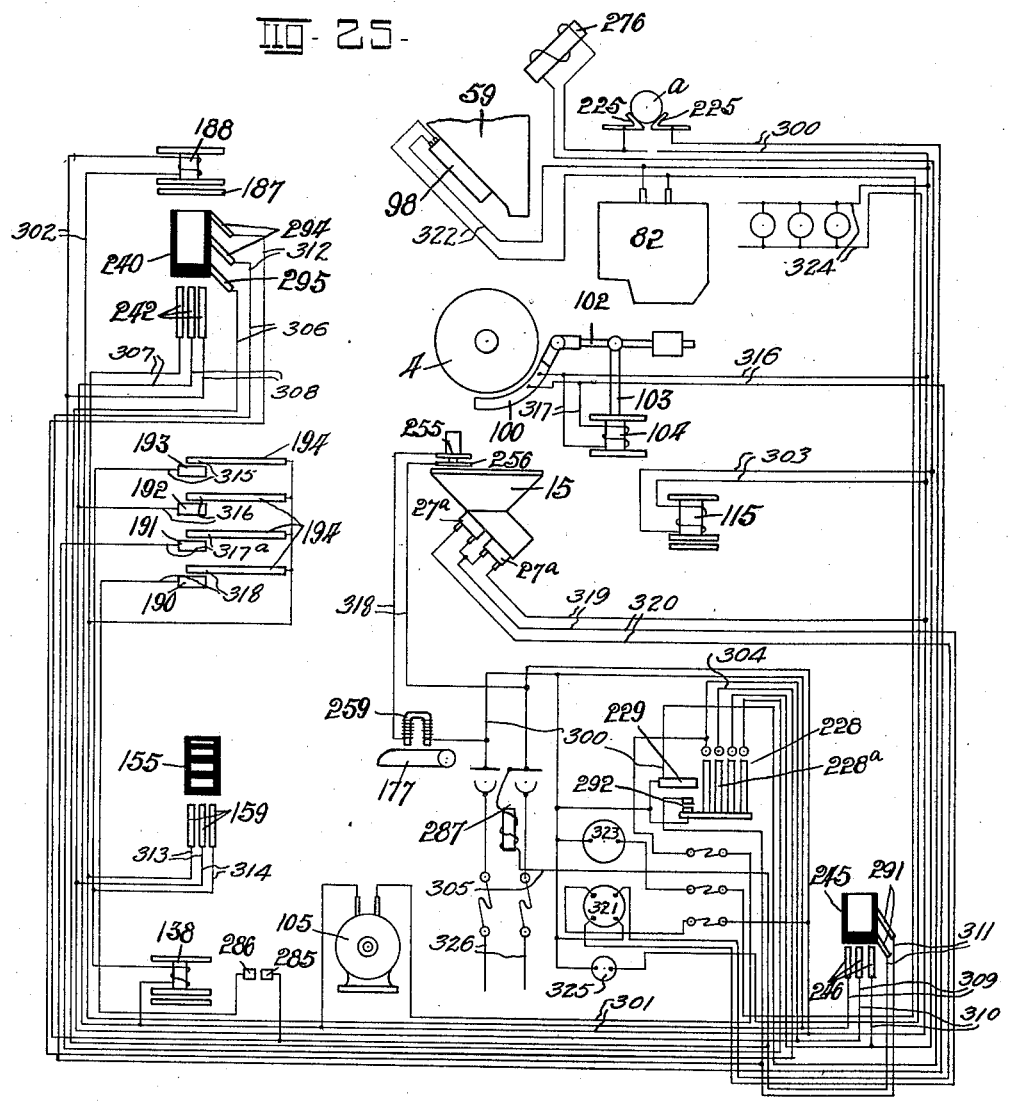

Patented June 1, 1926.

1,586,950

UNITED STATES PATENT OFFICE.

GEORGE H. HARTMAN, OF TOLEDO, OHIO.

POP-CORN-VENDING MACHINE.

Application filed July 3, 1922. Serial No. 572,493.

This invention relates to vending machines, and particularly to a coin-controlled pop-corn machine.

Numerous attempts have been made to provide a pop-corn vending machine which will supply popped corn to the storage hopper in sufficient quantity to take care of the corn delivery demands on the hopper, but none of these so far as I am aware, has been practical. In some cases the supply of corn to the hopper is controlled by weight, that is, if a pound of corn is removed from the hopper, approximately a pound is popped and delivered to the hopper. In another case measured quantities are removed and means are provided for supplying to the storage hopper a quantity of corn exactly the same amount in volume as removed. With both of these cases if the delivery of corn from the hopper is rapid or faster than the supply of popped corn to the hopper by the popping operations, the hopper will be gradually drained.

An object of the invention is to provide a commercially practical pop-corn vending machine wherein the popping of corn batches is not dependent on the delivery of corn from the machine, but is dependent, when the quantity of corn in the storage hopper is below a predetermined level, upon the depositing of a coin in the coin chute, and which is provided with numerous safety provisions which causes an opening of the main operating circuit when any abnormal condition, such for instance as the sticking of clutches, the burning in of a coin, or the like, occurs, thereby preventing injury to the machine parts and the liability of fire by a continued running of the machine under the abnormal condition.

Another object of the invention is to provide a pop-corn machine which will supply popped corn to the hopper more rapidly than it can be delivered therefrom, so that if four bags, for instance, are delivered from the machine during a popping operation, a much greater quantity will be popped and returned to the hopper by the popping operation.

Another object of this invention is to provide means which is automatically operable to discontinue the popping operations until the corn in the hopper has been lowered a predetermined extent by the delivery demands upon the machine.

A further object of the invention is the provision in a machine of the class described of delivery and popping mechanisms which are entirely independent of each other in their operation and wherein the popping mechanism is not dependent for its action on the delivery of corn from the machine.

Another object of the invention is the provision of a two-speed control for the popping mechanism whereby if two or more popping operations follow continuously one after another, the time for bringing the popping parts up to proper heat is saved for all operations after the first popping operation, thereby permitting a faster operating of the popping mechanism for the second and subsequent operations over the first operation and preventing a burning of the unpopped corn remaining in the drum after a normal popping cycle is completed.

A further object of the invention is to provide a soft supply control which is automatically operated by a manual release of a charge of popped corn from the discharge chute and may be supplied in any desired quantity to the corn, depending on the length of time the discharge chute is retained open.

Another object of the invention is the provision of means whereby the salt is discharged into the discharge chute at a point different from the point of discharge of the butter so that no caking of the salt or sticking of the same to the chute by reason of its coming in contact with the butter will arise.

A further object of the invention is the provision of a drainage means for excess butter flowing down the corn discharge chute and preventing it from having contact with the discharge nozzle or outlet portion of the discharge chute.

Further objects and advantages of the invention are apparent from the following detailed description.

While the invention in its broader aspect is capable of embodiment in numerous forms, a preferred embodiment thereof and of the different mechanism forming the same are illustrated in the accompanying drawings, in which,—

Figure 2:
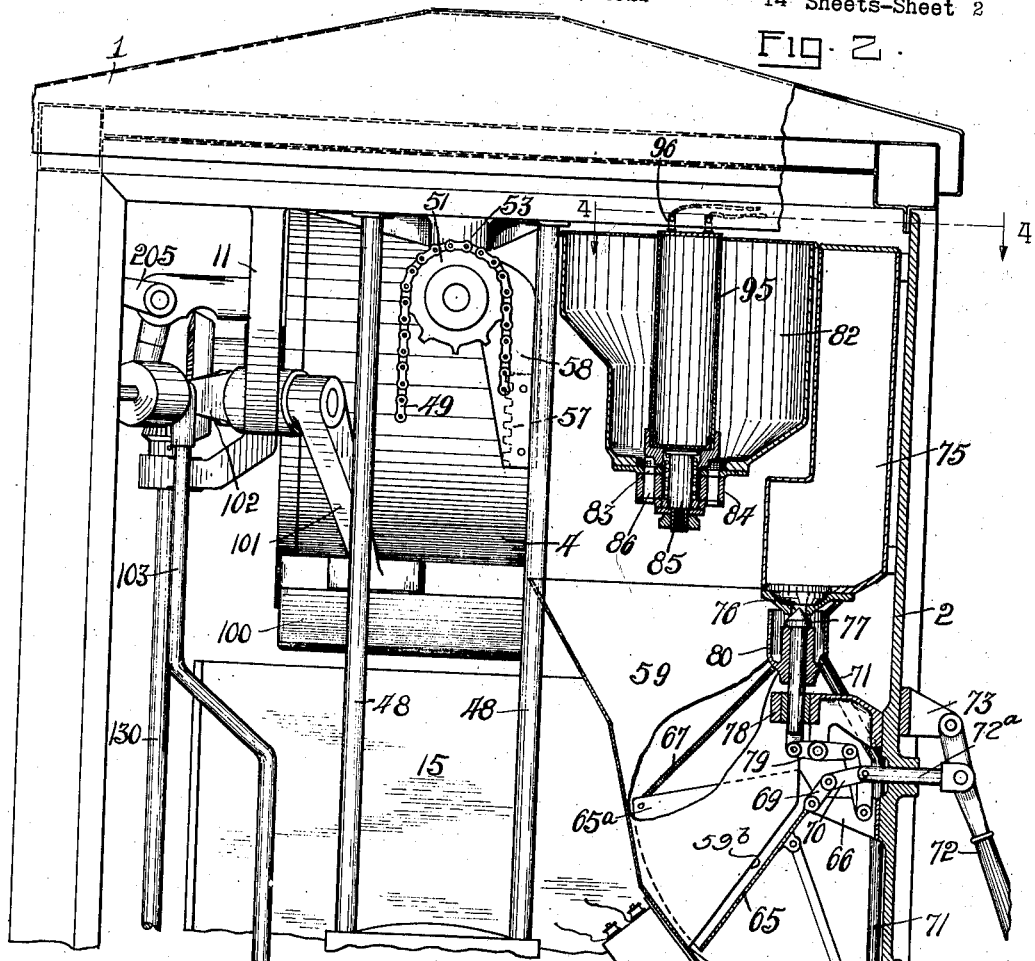
Figure 4:
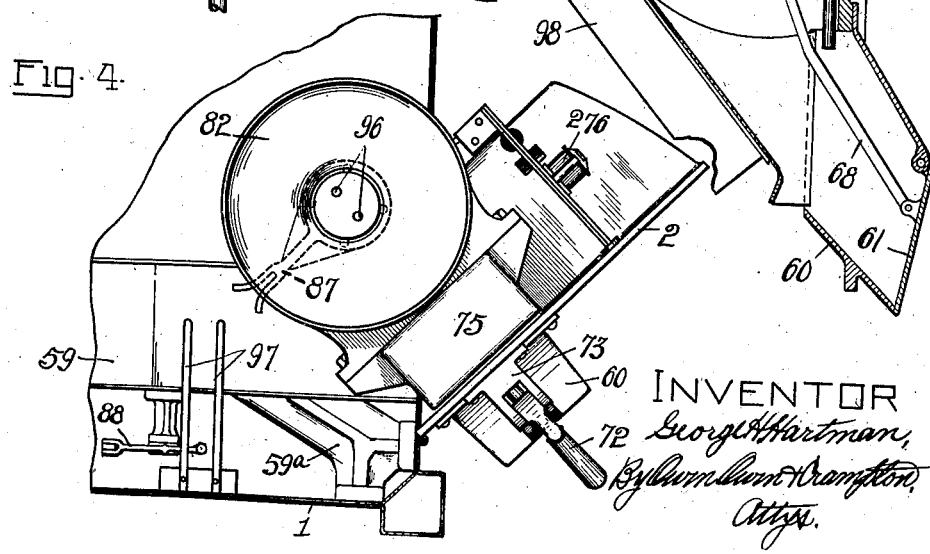
Figure 3:
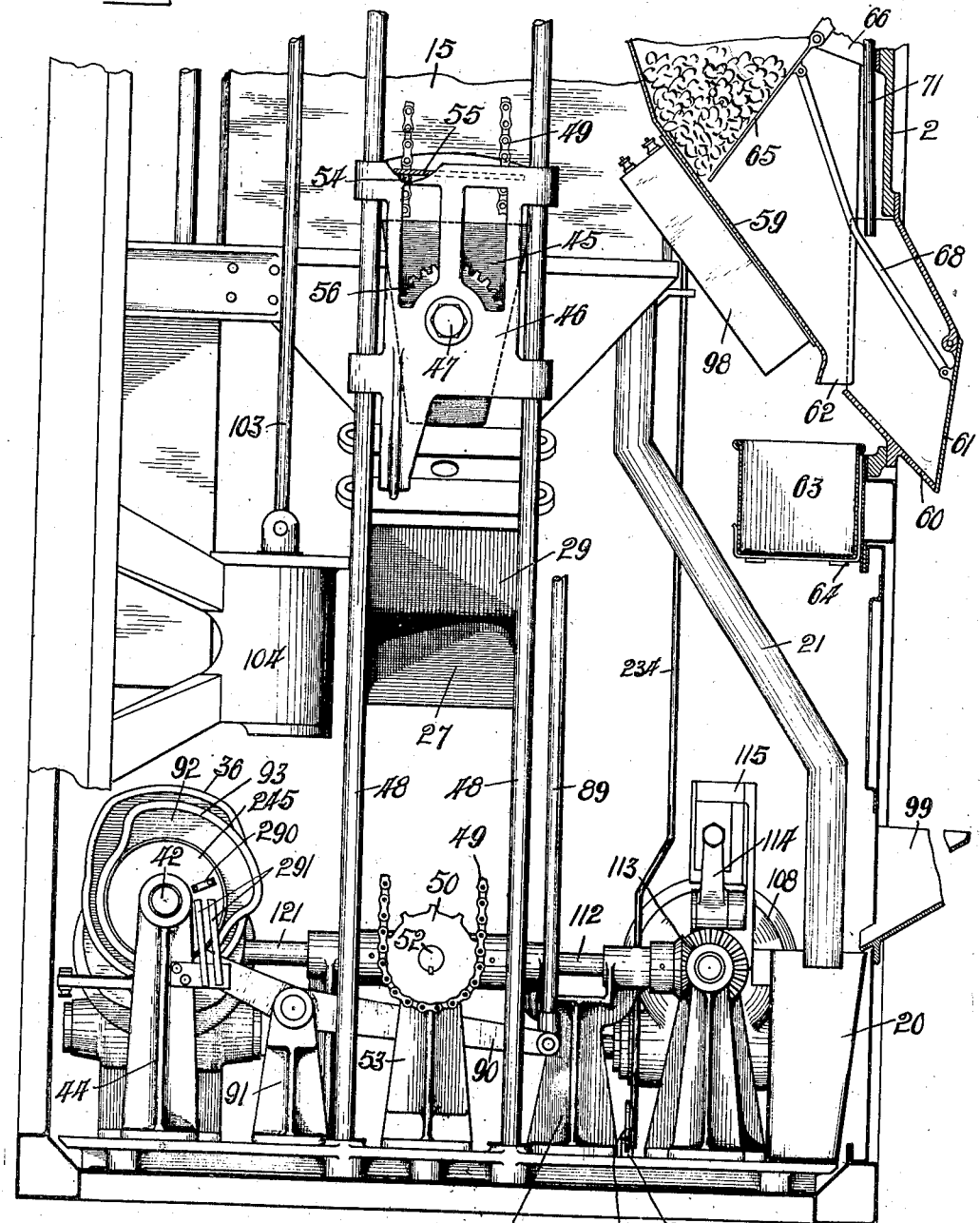
Figure 14:
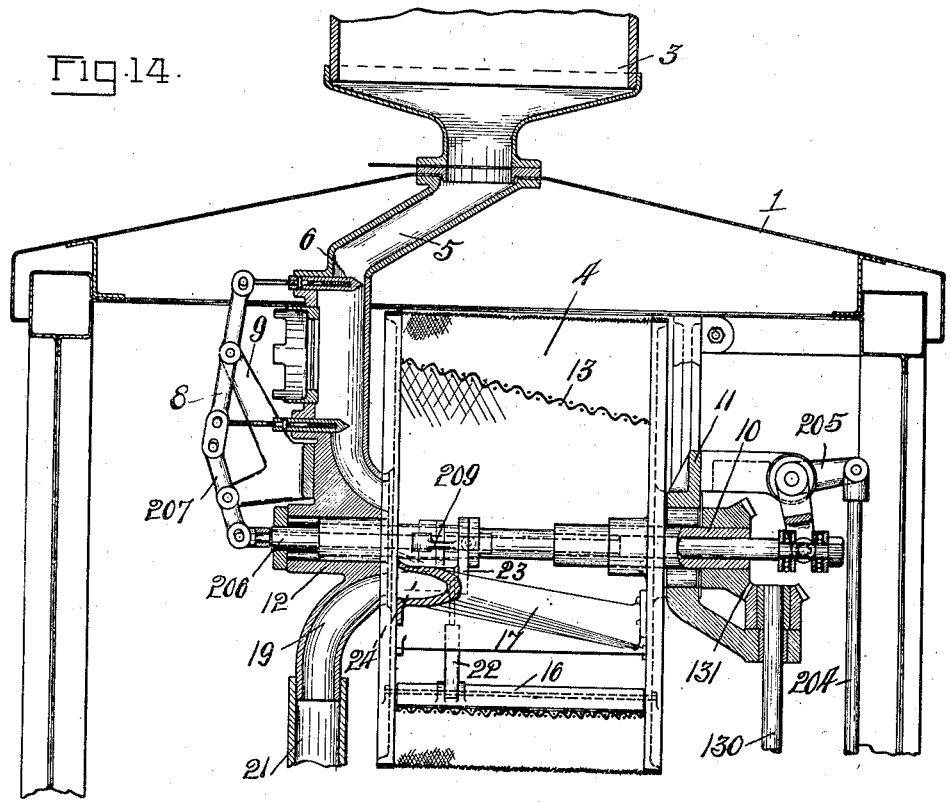
Figure 15:
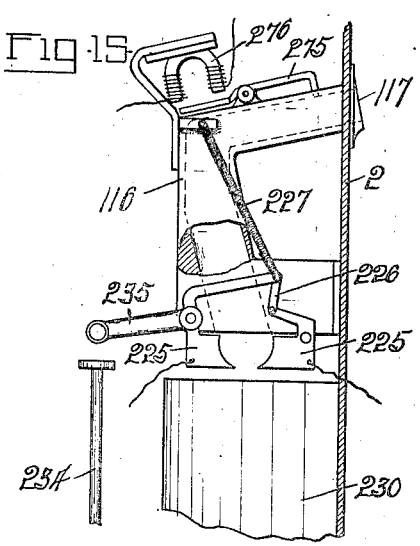

Figure 1 is a perspective elevation of a machine embodying the invention. Figs. 2 and 3 are respective elevations of the upper and lower portions of one side of a machine, with different parts broken away and in section, and parts showing the delivery, buttering and salting means for the popped corn. Fig. 4 is a fragmentary section on the line 4—4 in Fig. 2 with the door carrying the butter and salt container and other parts in partial open position. Figs. 5 and 6 are respective elevations of the upper and lower portions of another side of the machine, with parts broken away and parts removed. Fig. 7 is an opposite end elevation to that illustrated in Fig. 5 of the popping drum and associated parts, together with a portion of the carrying means. Fig. 8 is a section on the line 8—8 in Fig. 6 with parts broken away and parts removed. Fig. 9 is a fragmentary section taken substantially on the line 9—9 in Fig. 6 showing the indexing mechanism for the popping means. Fig. 10 is a vertical section thereof taken on the line 10—10 in Fig. 6. Fig. 11 is an inner side elevation thereof. Fig. 12 is a left end elevation of the indexing means. Fig. 13 is a cross-section thereof on the line 13—13 in Fig. 11. Fig. 14 is a central vertical section on substantially the line 14—14 in Fig. 5, with parts in full. Fig. 15 is a fragmentary detail of the coin-controlling means with a part in section. Fig. 16 is a diagrammatical view of portions of the different connected operating mechanisms with parts of the same broken away and parts in section. Fig. 17 is a side elevation of the measuring means for the popped corn. Fig. 18 is a plan of the movable member of the butter container control valve. Fig. 19 is a side elevation of the operating means for such valve. Fig. 20 is an enlarged fragmentary elevation of a portion of the popping drum driving mechanism shown in Fig. 6 with parts broken away. Fig. 21 is an enlarged section on the line 21—21 in Fig. 8 with parts broken away. Fig. 22 is an enlarged elevation taken on the line 22—22 in Fig. 8 with parts broken away. Fig. 23 is an enlarged detail with parts in section of a means for rendering the actuating mechanism inoperative when the popcorn is above a predetermined height in the hopper. Fig. 24 is a similar view of a different mechanism for performing such function, and Fig. 25 is a diagram of the electrical wiring employed.

Referring to the drawings, 1 designates the casing of a machine embodying the invention, which casing, in the present instance, is of rectangular form and has at each side thereof a door which is hinged to the casing frame to adapt it to be opened to render access to the mechanism within the casing from any side thereof. One of these doors, which is designated 2, and disposed at the front side of the machine, is smaller than the others and carries certain of the operating parts, as hereinafter described.

A hopper 3 for unpopped corn is mounted on the top of the casing 1, and the corn is periodically discharged therefrom in measured quantities into a subjacent popping drum 4 through a conduit 5. The conduit 5 opens at its lower end into the drum through a centrally disposed end opening therein and is provided with two valves or shutter members 6 and 7 in vertically spaced relation therein. These valves are mounted for transverse opening and closing movements in the conduit and are connected at their outer ends to a lever 8, which is mounted for rocking movements on a bracket arm 9 and is adapted upon a rocking thereof to impart alternate opening and closing movements to the valve members. It is evident, with this form of control for the unpopped corn, that when the lower valve 7 opens the upper valve 6 is closed, thereby permitting the measured charge of corn, which is disposed in the conduit 5 between the two valves, to be discharged into the popping drum. The movements of the lever 8 are automatically controlled by means hereinafter described.

The popping drum 4 is mounted within the upper portion of the casing for vertical rotation on a hollow shaft 10, which is journaled at one end in a bracket 11 and at its other end in a bracket 12, which brackets are suitably carried by the casing frame in the upper portion thereof. The bracket 12 in addition to forming a bearing for the shaft forms a part of the conduit 5 and carries the bracket arms 9. The shaft 10 is driven during each corn popping operation by means hereinafter described, and the drum has vertical rotation therewith. The ends of the drum are preferably formed of castings and the periphery thereof, of wire fabric or other suitable foraminous material, the mesh or openings of which should be sufficiently small to prevent unpopped corn from passing therethrough.

As the corn in the drum pops and the drum rotates the popped kernels are carried toward the center of the drum by a foraminous partition 13 disposed therein in eccentric and partially encircling relation to the drum axis, and this partition is tapered from one end to the other of the drum to direct the kernels toward a discharge opening 14 provided in an end member of the drum. The popped corn passes through this opening and falls into a subjacent hopper 15 wherein the popped corn is stored until delivered from the machine in measured quantities, as hereinafter described. The partition 13, which is preferably of wire fabric, has the openings therein of suitable size to permit the unpopped corn to pass therethrough but to prevent the popped corn from so doing.

During a popping operation a deflecting wing 16, which is pivotally mounted at the outer end of the partition 13 and is pivoted to the inner peripheral portion of the drum and extends entirely across the same, stands in the reclining position shown in Figs. 7 and 14, and when the popping operation is completed the wing 16 is automatically swung to substantially the dotted line position shown in Fig. 7 so that the unpopped kernels are directed into the adjacent open mouth of the discharge trough 17 as the wing passes through the upwardly extending arc of its movement instead of passing over the wing onto the partition 13, through meshes of which they would pass to the outer screen of the drum. The trough 17 is inclined relative to the drum axis, and, as it passes up over the drum axis, directs the kernels therein through an opening 18 in the end wall of the drum and into a discharge chute 19 in the bracket 12. The chute 19 communicates with a receptacle 20 in the bottom portion of the casing through a tube 21 (Fig. 3). The wing 16 is connected by a yielding link member 22 to one arm of a bell-crank lever 23 that is fulcrumed to a boss 24 projecting inward from one end of the drum. It will be understood that the wing 16 is not swung to kernel ejecting position until practically all of the popped corn has passed from the drum through the opening 14. The popping drum 4 is of a construction common in the art and the operation thereof in separating the popped and unpopped corn and delivering one to the receiving hopper 15 and the other to the receptacle 20 will be understood and therefore need not be more fully described.

The hopper 15 is of a size to store a considerable quantity of popped corn therein, and its bottom is preferably of conical form to facilitate the discharge of corn therefrom and is provided near its lower end with a downwardly inclined discharge chute 27 having two valves 28 and 29 disposed crosswise therein and functioning the same as the valves 6 and 7 for the unpopped corn to permit the discharge of measured quantities of popped corn from the hopper. A lever 30 is fulcrumed to a bracket arm 31 projecting from the bottom of the chute 27 and has one end in pivotal connection with the valve 28 to impart reciprocatory movements thereto when the lever is rocked and has its other end connected by a rod 32 to a subjacent lever 33. This lever is fulcrumed to a floor bracket 34 adjacent to one side of the casing and carries a roller at the end of its free arm which travels in a cam groove 35 in a side of a cam wheel 36. The slide valve 29 is connected at its outer end to a lever 37 carried by a bracket arm 38 on the bottom of the delivery chute 27 and the opposite end of said lever is connected by a rod 39 to one end of a subjacent lever 40, which is fulcrumed in the bracket 34 and carries a roller at its free end for traveling in a cam groove 41 disposed in the other side of the cam wheel 36. The cam wheel 36 is carried by a shaft 42, which is journaled in brackets 43 and 44 rising from the bottom of the casing 1 near one side thereof (Figs. 3, 6 and 8). The driving means for the shaft 42 will be hereinafter described. An electric heater $27^a$ is secured to each side of the chute 27 and heats the corn contained in the chute before discharging therefrom. The chute 27 is provided between the valves 28 and 29 with a top plate $27^b$, which is carried by a screw $27^c$ and is adjustable by a turning of the screw to vary the size of the measuring space between the valves.

The corn delivery means includes a bucket 45, which is carried at the inner side of a cross-head or slide-frame 46 by a pivoted bolt 47, which permits the bucket to have pivotal movements about the bolt 47 as an axis. The bucket is caused by gravity to normally stand in upright position with its open end upward. The cross-head 46 is guided for vertical movements by a pair of parallel guide-rods 48, which are disposed at one side of the casing and extend from the bottom to the top thereof, as shown in Figs. 2, 3 and 6. The vertical movements of the cross-head are controlled and effected by an endless sprocket chain 49, which is disposed between the two guide-rods 48 and extends at its lower end around a sprocket wheel 50 and at its upper end around a sprocket wheel 51. The lower sprocket wheel 50 is mounted on a shaft 52 that is journaled in a bracket 53 rising from the bottom of the casing and this shaft is intermittently driven, as hereinafter described. The upper sprocket wheel 51 is an idler and is carried for vertical adjustment by a bracket 53 secured to the top portion of the casing. The chain 49 has a pin 54 projecting therefrom and adapted during an upward movement thereof to engage a registering flange or part 55 on the cross-head during a lowering movement of the pin. A pinion 56 is fixed to a side of the bucket 45 in concentric relation to its turning axis, and when the cross-head is near the upper end of its movement the pinion engages a rack 57 (Fig. 2) and is given a partial turning movement by the rack to effect a tilting of the bucket to discharge the popped corn therefrom. The rack 57 is carried by a convenient bracket or frame part 58, which extends down from the vertically adjustable sprocket-wheel carrying part of the bracket 53, so it and the sprocket-wheel have adjustment together.

The corn in its discharge from the bucket enters the upper end of a guide chute 59, which is secured to the casing frame by frame lugs 59ª (Fig. 4), and has its upper end open and disposed in suitable position to receive the discharge, as indicated in Fig. 2. This chute is disposed at the inner side of the door 2 and has its front or outer wall formed, in the present instance, thereby. The side of the chute opposed to the door inclines downward toward the door and terminates adjacent thereto in position for the popped corn discharged therefrom to enter a downwardly inclined discharge nozzle 60, which projects through an opening in the door (Fig. 3), and is closed at its outer end by a gate 61. This gate is hinged to the upper outer edge of the nozzle 60 and is adapted to normally hang downward in closing relation to the opening. The adjacent ends of the bottom inclined portions of the chute 59 and nozzle 60 are spaced slightly apart to provide a gap 62 therebetween, which space is sufficiently narrow to permit the corn to carry across the same in its discharge down the chute but causes any waste butter travelling down the inclined bottom portion of the chute to pass through the space 62 and enter a subjacent receptacle 63. This receptacle is carried by a bracket 64 at the front of the casing at the inner side thereof and immediately below the opening provided in the casing for the door 2.

A main gate 65 is provided in the chute 59 intermediate its ends for stopping the passage of corn therethrough and is pivotally hung at its upper end on a bracket 66 projecting from the inner side of the door 2. When the door is closed the gate projects through an opening 59ᵇ in the adjacent side of the chute and has a flange 65ª at its inner side which laps the inner side wall of the chute at its outer side and serves to close the opening 59ᵇ when the gate is swung down. This gate is normally held in closing relation to the chute 59 by a coiled contractile spring 67, which connects a side edge of the gate to the door 2 at a point above the gate hinges (Fig. 2). The gates 61 and 65 are connected by a rod 68, which is pivoted to each, and the opening movements of the gates, which are in unison, are downward and forward with respect to the chute. An arm 69 projects from the inner pivoted end of the gate 65 and is connected by a link 70 to a push rod 72ª, which slidingly projects through a registering opening in the door 2 and is connected at its outer end to an operating hand lever 72. This lever is pivoted to a bracket 73 on the outer side of the door 2, and an inward movement of the lever from normal position imparts an opening movement to the gate 65 and also to the gate 61 with which it is connected.

A container 75 for salt (Fig. 2) is carried by the door 2 at its inner side over the open upper end of the chute 59 and has a bottom discharge opening 76 that is controlled by a valve 77. The stem of the valve projects down through the bracket 78 and is connected through a series of levers 79 with the push rod 72ª so that when the rod is in outward or normal position, the valve will be seated to close the opening 76, and when the rod is pressed inward to effect an opening of the gates 65 and 61, the valve will be lowered to permit a discharge of salt from the salt container down through the chute 59. In the present instance, a channeled collar 80 encircles the valve stem and the discharging of salt from the container is into the channel of such collar and then down through an opening in the channel bottom and a tube 71 to a point in the nozzle 60. It is important to discharge the salt into the nozzle 60 instead of into the chute 59, as the bottom wall of the latter is usually coated with butter, which would tend to retain and cause a caking of the salt, whereas the bottom of the nozzle 60, being in advance of the gap 62, is practically free of butter and therefore permits a free flowing of salt down the same. It is evident that the discharge of salt is manually and not automatically controlled and that instead of a measured quantity of salt being discharged into the corn at each corn discharging operation, the salt will continue to flow in a fine stream so long as the control handle 72 is depressed, thus permitting the person purchasing a bag or supply of corn to season to suit his taste.

A butter container 82 is suspended within the upper portion of the casing over the discharge chute 59 and is provided with one or more discharge openings 83 in its bottom, and, in the event a plurality of such openings are used, they are preferably arranged in circular series. A rotary valve disc 84 is mounted on a stem 85 below the bottom of the butter container in position to close the openings 83, and it has openings 86 therethrough which are adapted to be moved into register with the openings 83 by a turning of the valve, thus permitting a discharge of butter from the container, such discharge being down into the chute 59 and onto the corn which is supported in the chute by the gate 65. The valve 84 has an arm 87 (Figs. 18 and 19) projecting radially therefrom and forked at its outer end, with the fork arms flaring outward at their ends to provide a broad mouth. One end of a bell crank lever 88 engages within the fork of the valve arm to impart opening and closing movements to the valve when the lever is rocked and the other end of the lever is connected by a rod 89 to a lever 90, which is fulcrumed in a bracket 91 within the lower portion of the casing (Fig. 3). The free end of the lever 90 carries a roll which travels in a cam groove 92 provided in a side of a cam wheel 93 that is fixed on the shaft 42. The lever 88 is disposed adjacent to the side of the machine at the left of the door 2 and is fulcrumed to a bracket 94 secured to a side of the chute 59. The opening of the valve 84 is timed to take place immediately after a quantity of corn has been discharged into the chute 59 from the bucket 45. An electric heating element 95 is disposed within the butter container 82 to keep the butter therein in a fluid state. The two contacts for the heating element are designated 96 (Figs. 2 and 4), and these are adapted to be engaged by spring contact fingers 97, which project from the adjacent casing side and are disposed in an electric circuit, hereafter described.

The salt and butter containers 75 and 82 are carried together by the door 2 (Fig. 4), as is also the gate 65 and nozzle 60 so that upon an opening of the door said parts will swing outward therewith to accessible position. When the container 82 is swung outward with the door the valve arm 87 swings outward from engagement with the lever 88, the arm being forked for such purpose, and the heater contacts 96 swing outward from engagement with the contact fingers 97.

It is preferable to provide an electric heater 98 at the under side of the discharge chute 59 to warm corn disposed in the chute and to prevent butter from congealing and collecting on the bottom surface of the chute. The butter which passes through the corn is caused to run down the chute and to pass through the gap 62 into the receptacle 63 instead of discharging from the outer end of the chute, as is usually the case with machines of this character. This is a very important feature as it prevents the butter from dripping down from the discharge nozzle 60 and also tends to obviate flies gathering around and on the discharge nozzle. This is also prevented by the gate 61 which closes the nozzle. If there is any accidental discharge of corn or salt from the nozzle 60 when a bag or other receptacle is not disposed in position to receive the same, such corn or salt drops into a trough or receptacle 99 secured at the lower portion of the casing front below the nozzle 60, and the corn and salt, or other matter, are directed by the inclined bottom of the trough 99 into the receptacle 20 through an opening in the casing front, as shown in Fig. 3.

The popping heater 100 (Figs. 2 and 5), which is preferably an electric heater, is disposed under the popping drum 4 adjacent thereto and is carried by an arm 101 that is pivoted to a part of the bracket 11 to adapt the heater to be swung vertically into and out of popping relation to the drum. A weighted arm 102 extends rearward from the heater arm pivot and partially counterbalances the weight of the heater. A rod 103 is pivotally connected to and extends down from the arm 102 and is connected at its lower end to the core of a solenoid 104 (Fig. 3) secured to the casing frame. When the solenoid is energized the rod 103 is pulled down and the heater swung upward thereby to operative relation to the popping drum. The heater and solenoid circuits are controlled as hereinafter described.

The power for driving the different mechanisms of the machine is derived from a motor 105, which is mounted on the base shaft 106 extending from both sides thereof. This shaft at one side of the motor carries a worm (not shown) in mesh with a worm-wheel 107 (Figs. 8 and 16) mounted in a gear case 108, and fixed to a shaft 109. This shaft at one side of the worm-wheel has a clutch collar 110 feathered thereon for shifting movements longitudinally thereof and movable into clutch engagement with the clutch end of a sleeve 111, which is loose on the shaft and is in driving engagement with a countershaft 112 through a set of bevel gears 113. The clutch member 110 is engaged by a shifting lever 114, which is connected to an armature associated with an electro-magnet 115, whereby an energizing of the magnet actuates the lever to throw the clutch member into engagement with its companion. The electro-magnet circuit is automatically closed by depositing a coin of proper denomination in a coin chute 116, as hereinafter described, said chute being carried, in the present instance, by the door 2 and having an entrance slot 117 at its outer end.

The shaft 112 is journaled in a bracket 118 rising from the floor of the casing 1, and the shaft is connected at an end thereof through a set of bevel gears 119 with the drive shaft 52 of the corn delivery mechanism. The shaft 52 is in turn connected at its inner end by a set of bevel gears 120 to a shaft 121, which is journaled near its inner end in a bearing 122 rising from the casing floor, and at its other end in a bearing 43. The shaft 121 has worm and worm-wheel driving connection (Figs. 6 and 17) with the shaft 42, which, through the cam wheel 36, controls the corn delivery gates 28 and 29 in the discharge chute 27, and through the cam 93 controls the butter discharge valve 84.

When a cycle of corn delivery operations has been completed the circuit of the electro-magnet 115 is automatically opened, as hereinafter described, and the clutch member 110 is withdrawn from operative position, thereby stopping the action of the delivery parts. At each corn delivery cycle the chain 54, which supports the bucket carrying cross-head 46, traverses its complete course of movement to move the bucket 45 to corn receiving position, then to elevate it to discharging position and then to return it to its normal at-rest position, shown in Figs. 3 and 6, and each of the cams 36 and 93 makes a single complete revolution. The opening of the discharge valve 29 is timed to take place immediately after the bucket 45 has lowered to receiving position and while the chain pin 54 is passing under the sprocket wheel 50, during which period the bucket temporarily remains at rest. The opening of the butter control valve is timed to take place after a bucket of corn has been dumped into the discharge chute 59.

The other end of the rotor shaft 106 to that which drives the corn delivery mechanism is intended to drive the popping drum 4, and for such reason has worm and worm-wheel connection 125 with a shaft 126 that is mounted in a bearing bracket 127 rising from the base of the casing (Figs. 6 and 16). The shaft 126 has a sleeve 128 mounted for free rotation thereon and in bevel gear connection 129 with a vertical shaft 130, which is journaled at its lower end in the upper portion of the bracket 127 and at its upper end in an arm of the bearing bracket 11 (Figs. 2, 5 and 14) in the upper portion of the casing. The shaft 130 is in bevel gear connection 131 at its upper end with the shaft 10 carrying the popping drum 4 so that a driving of the shaft 130 will impart rotation to the drum.

The sleeve 128 has a clutch member 132 at its outer end adapted to be engaged by a shiftable clutch member 133, which is mounted for limited longitudinal movements on the shaft 126 and for rotation therewith so that when in engagement with the clutch member 132 rotation is imparted to the popping drum. A lever 134 is fulcrumed on a stud projecting from the upright portion 135 of the bearing bracket 127, and has one end in forked engagement with the clutch member 133 to impart longitudinal shifting movements thereto when the lever is rocked. The other or upper end of the lever is connected to an armature 136, which is carried by a guide part 137 of the bearing bracket for sliding movements toward and away from an electro-magnet 138 that is carried by said bracket. It is evident that an energizing of the electro-magnet, the circuit of which is automatically controlled as hereinafter described, attracts the armature 136 thereto and effects a movement of the clutch member 133 into engagement with its companion so that the popping drum is then connected up with and driven by the power means, such driving of the drum continuing so long as the magnet is energized.

In machines of this character it is important to maintain a supply of popped corn in the hopper 15 at all times sufficient to take care of any delivery demands on the same. To accomplish this I provide an indexing mechanism for the popping means which former is operated by an actuating mechanism that is driven by the motor when a coin is deposited in the slot 117, but is automatically controlled by the rising and falling of the quantity of corn in the hopper so that when there is a predetermined quantity of corn in the hopper the indexing mechanism is disconnected from the actuating mechanism, and when the corn in the hopper has been lowered a predetermined extent the indexing and actuating mechanisms are connected to permit an operating of one by the other and a consequent popping of a quantity of corn sufficient to raise the corn in the hopper an extent necessary to disconnect the indexing and actuating mechanisms.

The indexing mechanism includes a shaft 140, which is journaled transversely of the machine interiorly of the casing in bearing brackets 141, which project from the adjacent corner uprights of the casing frame in elevated relation to the floor of the casing with one end disposed over the bracket 127 and over the popping drum driving and controlling means carried by the bracket. A ratchet wheel 142 is mounted on the shaft 143 within a part of the left-hand bearing 141 over the shaft 140 and is engaged by a pawl 144 that is carried by arms 145 for rocking movements about the shaft 143. The pawl is connected by a rod 146 to one end of the lever 147, which is fulcrumed to a bracket arm 148 of the bracket 127 for vertical rocking movements relative thereto. The opposite end of the lever 147 is pivotally connected to a stem 149 that is guided for longitudinal vertical movements in the arm 148 and carries a roller 150 at its lower end which rests on a crown-cam 151 whereby rotary movements of such cam impart reciprocatory movements to the stem 149 and corresponding reciprocatory movements to the pawl 144 to actuate the ratchet wheel. The cam is fixed to the shaft 130 for rotation therewith so that when the popping drum is being driven the ratchet feed means for the indexing mechanism is also being driven. A coiled compression spring 152 acts on the stem 149 to yieldingly hold its roller to the cam face.

The ratchet-wheel shaft 143 carries a pinion 153 in mesh with a gear 154 on the shaft 140 to communicate rotation from one to the other of said shafts. An electric switch drum 155 is loosely carried by the shaft 140 in axially spaced relation to the gear 154 and has a pair of indexing spur gears 156 and 157 fixed thereto for rotation therewith, the gear 157 being adjacent to the gear 154. The drum 155 has a plurality of contact plates 158 arranged in equidistantly spaced relation around its periphery, with the spaces therebetween of insulating material. A set of three spring contact fingers 159 coacts with the drum surface and when in contact with one of the conductor plates 158 closes a motor circuit and also a circuit in which the magnet 138 is disposed, as hereinafter described. The drum is provided with a peripherally notched surface 160, which is engaged by a detent roll 161 to yieldingly hold the drum at successive steps of its indexing movements.

A forked arm 162 is fixed to the shaft 140 for rotation therewith intermediate the gears 154 and 157, and a yoke 163 is carried by the fork arms for yielding movements radially of the shaft, having legs projecting into sockets in the furcations of the forked arm, as best shown in Fig. 12. The arm and yoke are tied together by bolt members 164 to limit the outward movements of the yoke relative to the arm, and coiled compression springs 165 are disposed between the yoke and arm to resist an inward movement of the former. A stem 166 (Fig. 9) projects through the outer portion of the yoke radially of the shaft for longitudinal movements relative to the yoke and has a tooth 167 at its inner end in radial register with the indexing gear 157 and adapted to engage the same when the yoke is moved radially inward. The tooth 167 is normally held projected relative to a portion of the yoke through which its stem projects by a coiled compression spring 168. The tooth 167 normally stands out of engagement with the teeth of the indexing gear 157 and is moved into engagement with the gear at a predetermined point in a revolution of the yoke by reason of a roller 169 on the yoke passing through a camway 170, which is fixed to a connecting portion 171 of the bearing brackets 141 (Figs. 9 and 12). The cam 170 is so shaped that the indexing tooth 167 is moved into and held in engagement with the gear 157 during a predetermined portion of each revolution of the yoke a sufficient period for the tooth to move the gear wheel and connected switch drum backward a predetermined distance.

A corresponding forward indexing of the switch drum 155 is effected, in the present instance, upon the insertion of each fourth coin in the coin slot 117 irrespective of whether or not the coin delivery mechanism is operating. To accomplish this a flexible shaft 172 is mounted over the shaft 140, being journaled at one end in the bearing bracket 173 and at its other end in the bearing bracket 174, both projecting from the cross-bar 171, the shaft having a flexible portion intermediate the two bearings, as shown, which is also capable of limited lengthening and shortening movements. The shaft 172 is provided over the forward indexing gear 156 with a pinion 175, which, in the present instance, is provided with two equidistantly spaced teeth (Fig. 13), each of which is adapted to engage and impart a partial forward rotation to the gear 156 and associated switch drum at each revolution of the pinion.

The actuating means for the shaft 172 includes a ratchet wheel 176 mounted thereon and having, in the present instance, eight teeth. This wheel is engaged and intermittently moved forward the distance of a tooth by the successive movements of a pawl 177, unless the pawl is held in inoperative position by means hereinafter described, which means is controlled by the height of coin in the hopper 15. The pawl is carried by a rocker lever 178 fulcrumed to the bracket 174, and one arm of this lever is connected by a bar 179 to an eccentric or crank pin 180 provided at an end of a shaft 181 (Figs. 16 and 22). The shaft 181 is journaled in and projects from a housing 182 and has worm and worm wheel connection 183 in such housing with a clutch sleeve 184 that is loosely mounted on the adjacent end of the shaft 109 (Figs. 21 and 22). A clutch collar 185 is feathered on the shaft 109 and is moved into and out of driving engagement with the sleeve 184, being controlled by the movements of a bell-crank-lever 186. The outer arm of this lever carries an armature 187 that is attracted to an electro-magnet 188 when energized, said magnet being in a suitable electrical control circuit, as hereinafter described. The weight of the armature on the lever normally retains the clutch collar 185 in inoperative position and an energizing of the magnet moves the lever to clutch engaging position.

The driving of the shaft 181 is so timed with respect to the driving of the popped corn delivery mechanism that said shaft makes a complete revolution for each cycle of operations of the delivery mechanism, and if the corn delivery mechanism is inoperative for any reason the shaft 181 makes a complete revolution for each coin inserted in the coin slot, as hereinafter more fully explained. It is thus evident that for each coin deposited in the coin slot the shaft 172 of the forward indexing mechanism for the switch drum 155 has one-eighth of a turn imparted thereto, provided of course, there are eight teeth in the ratchet 176 as in the present case, and that at each fourth ratchet movement of the shaft a tooth of the pinion 175 is brought into engagement with a tooth of the forward indexing gear 156 and imparts a movement thereto equal to twice the pitch of a tooth of the gear and corresponding to the length of reverse movement imparted to the drum 155 by the engagement of the tooth 167 with the gear 157.

It will be understood that when the switch drum 155 is at rest, and the popping mechanism is not in operation, the switch contact fingers 159 will stand in engagement with an insulated gap portion of the drum, which is disposed between the ends of a pair of contact plates 158, and that a single movement of the drum by a tooth of the pinion 175 will move the drum forward sufficiently to place a succeeding contact plate in engagement with the contact fingers, thereby closing circuits to the motor 105 and magnet 138 to effect a starting of a popping operation. During the popping of a batch of corn the yoke 163 is timed to make one complete revolution in the reverse direction to that in which the pinion 175 drove the switch drum, and during a passage of the yoke wheel 169 through the cam 170 the tooth 167 is engaged with the back turning index gear 157 and returns the switch drum to its previous off position, except as hereinafter described.

The shaft 140 carries four master switch drums 190, 191, 192 and 193 each of which has a respective switch finger 194 in engagement therewith. Each of these switch drums has a split peripheral conductor ring with which the fingers 194 are adapted to have contact and the gap between each ring end is insulated. When the indexing mechanism is at rest, each contact finger is in engagement with the insulated gap portion of its drum. Two of these drums, 190 and 191, in the present instance, act as the control switch for the solenoid 104, the energizing of which effects a movement of the popping heater 100 to operative popping relation to the drum 4, as shown in Figs. 2, 3 and 5. This switch also acts to control the heating element circuit of the popping heater 100. It is thus evident that when the shaft 140 has been indexed forward one step by the engagement of a tooth of the pinion 175 with the gear 156 the circuit of the solenoid 104 will be closed by the switches 190, 191 to effect a raising of the popping heater to operative popping relation to the drum 4 and a closing of the popping heater circuit. The other pair of said switch drums 192 and 193 are in circuit with the motor 105 and also with the electro-magnet 138 so that the motor is started and the control clutch 133 is thrown to start rotation of the popping drum simultaneously with the turning on of the heating circuit and the movement of the heater to operative position.

The intermittent feeding of unpopped corn from the supply chute 5 to the popping drum is timed to take place immediately after the rotation of the popping drum has been started and is controlled from a cam 200 on an end of the shaft 140. This cam has a cam-way 201 in a side thereof in which a roller 202 that is carried by a lever 203 travels (Figs. 6 and 12). This lever is pivoted at one end to a part of the adjacent bearing bracket 141 and is connected at its other end by a rod 204 to a bell-crank lever 205 (Fig. 14), which is mounted on an arm projecting from the bearing bracket 11 at the upper portion of the casing and at one end of the popping drum 4. The other end of the lever 205 is connected to a rod 206, which is mounted in and projects through the hollow shaft 10, carrying the popping drum, and is connected at its opposite end to one end of the lever 207, the other end of which is connected to the lever 8 which operates the corn feed valves 6 and 7.

It is evident that when the rod 204 is raised the upper valve 6 is moved inward to close the supply chute 5 and the lower valve 7 is moved outward to permit the measured quantity of corn disposed between the two valves to pass into the popping drum. The stems of the valves 6 and 7 are yieldingly connected to the valves so that each valve is permitted to strike and have its movement stopped by the registering side wall of the chute 5 before the inward movement of the associated valve stem has been stopped. It is thus evident that with this arrangement the inward movement of the upper valve 6 will have been completely closed before the lower valve 7 is opened thus preventing any corn from passing the upper valve after the lower valve begins its opening movement.

The wing 16, which controls the discharge of unpopped corn from the popping drum 4 after a popping operation, has its operating lever 23 connected by a rod 208 to one arm of a bell-crank lever 209 (Figs. 7 and 14), which lever is fulcrumed in the drum adjacent to one side of its axis, and the other arm of this lever is in operative engagement, through an opening in a side of the drum shaft 10, with the rod 206, whereby a movement of such rod to close the lower valve 7 and open the upper valve 6 will impart a movement to the gate 16 to place it in operative relation to the discharge trough 20.

In order to prevent any possibility of a tooth of the indexing pinion 175 being in forward driving engagement with the forward indexing gear 156 when the reversing tooth 167 is in driving engagement with the rearward indexing gear 157 of the main switch drum 155, the end of the shaft 172 which carries the pinion 175 is mounted for limited vertical movements in the bracket 173 and is automatically raised to prevent a tooth on the pinion from engaging its gear 156 when the tooth 167 is in position to engage and drive its gear. To accomplish this the shaft 172 is made flexible and the pinion carrying end thereof is mounted in a vertically movable bearing block 210 (Fig. 10), which is guided for vertical movements by the bracket 173 and is acted on by a coiled compression spring 211 to normally hold the shaft and its pinion in operative driving relation to the gear 156. A cam wheel 212 is fixed to the indexing shaft 140 and receives the downward thrust of the bearing block 211. This wheel has a protuberant cam portion thereon which is adapted to engage and raise the bearing block 210 to place the pinion 175 in inoperative position during the period of passage of the indexing yoke 163 through the operating portion of the cam 170.

It is evident that inasmuch as a complete rotation of the indexing shaft 140 determines the period of a corn popping cycle it is important to have the speed of rotation of the indexing shaft regulable so that a longer or shorter period may be given for the popping operation, depending on whether or not the corn used requires a shorter or longer period for popping and also on the temperature condition of the popping drum and heater upon the starting of a popping operation. It will be understood that if one popping operation immediately follows another the heat radiating parts of the heater 100 and the portion of the popping drum with which the cam has contact will be at a high temperature from the previous popping operation so that the same length of time will not be required to bring the parts up to proper heat as when starting a popping operation when the parts are cold. To automaticaly take care of such conditions I have provided a two-speed feed control means for the feed pawl 144 whereby the length of stroke of the pawl is automaticaly lengthened to impart a more rapid rotation to the indexing shaft 140 after said shaft has had a complete rotation and continues its rotation for a second cycle of operations. To accomplish this a cam wheel 213 (Figs. 9 and 10) is fixed to the shaft 140 and acts on a subjacent rod 214 (Figs. 6 and 20) to force such rod downward when the shaft 140 has approximately completed a full rotation. The rod 214 rises from an upright socketed portion of the bearing bracket 127 and is normally held in elevated position by a spring 215 disposed in the bottom of the socket. A finger 216 projects from the armature 136 for movement therewith and carries a spring pressed catch 217, which, when the armature is in attracted or operative relation to the magnet 138, stands in position to engage a notch 218 in the rod 214 when the rod has been depressed to place such notch in register with the catch. It is thus evident that if the shaft 140 continues to rotate after the first cycle thereof, and the circuit of the electro-magnet 138 continues closed, which would be the case, the armature 136 will remain at the limit of its inward movement and the rod 214 will continue to be held depressed by reason of the engagement of the catch 216 with the notch 218 therein. A lever 219 is fulcrumed to the inner end of the armature carrying portion of the bracket 137 and projects across the rod 214, being pivoted thereto, and has its free end disposed in position to be struck by a tappet screw 220 on the pawl operating lever 147. When the rod 214 is in normal elevated position the lever 219 is held elevated thereby so as to engage the tappet 220 and limit the permissible ratchet wheel operating stroke of the pawl 144. The spring 152 is made considerably lighter than the spring 215 so that the pressure of the former through the tappet onto the lever 219 will not effect a lowering of the rod 214 against the tension of the spring 215. When the rod 214 has been moved downward by the cam 213 to catch engaging position, the lever 219 will be moved downward therewith thereby permitting the tappet 220 to move the full length of its downward stroke and impart a correspondingly greater length of stroke to the pawl 144.

A further control of the length of stroke of the pawl 144 and the consequent speed of rotation of the shaft 140 may be effected through the adjustment of a stop screw 221, which is carried above the pawl by a bracket arm 222 in position for its lower end to be placed in coacting stop relation to the pawl.

The coin chute 116 is provided at its lower end with a pair of spaced contact fingers 225 which are of lever form and pivotally carried by the chute frame and adapted when in normal position to support a coin $a$ at the lower end portion of the chute. These contact fingers are connected at their inner ends by a link 226 whereby a movement of either finger will impart opposed opening movements to the two fingers in unison to drop a coin supported thereby. A coiled contractile spring 227 connects the inner end of the contact fingers to a portion of the chute frame and acts to normally retain the fingers in coin supporting relation, as shown in Fig. 15. These fingers cooperate with a coin to form what may be termed a coin switch that controls a relay switch 228 shown in the wire diagram in Fig. 25. For this purpose the contact fingers 225 are in a normally open electric circuit with the relay operated magnet 229 (Fig. 25) so that when the circuit is closed by a coin disposed between the contact fingers 225 the relay magnet will be operated to close the relay switch. The closing of this switch throws a current into the motor 105 to run the same, closes the circuit to the magnet 188 in the actuating mechanism, closes the magnet 115 in the delivery mechanism, and closes the magnet, as shown by the wire diagram.

A coin in circuit closing contact with the switch fingers 225 is intended to be released from engagement therewith at a predetermined point in a rotation of the shaft 181 of the actuating mechanism, the coin then falling into a subjacent receptacle 230 carried by the door 2 at its inner side. (Fig. 15).

The coin knock-out means for effecting this comprises a bar 231 (Figs. 8 and 16), which connects the eccentric 180 on the shaft 181 to one-arm of a bell-crank lever 232, which is fulcrumed in upright position to a floor bracket 233, the other arm of said lever being connected to the lower end of a knock-out bar 234, which is guided for vertical reciprocatory movements and has its upper end terminating in subjacent relation to an arm 235 on one of the contact fingers 225. It is evident that the bar 234, when raised, will engage and raise the arm 235 and impart an opening movement to the connected contact fingers 225 sufficient to release a coin supported thereby and permit it to drop into the receptacle 230.

In order to insure a complete cycle of operations of the actuating mechanism for the coin knock-out and the indexing mechanism when a cycle of operations has been started and also to insure a complete cycle of operations of the coin delivery mechanism after the starting of such operation, said actuating mechanism and delivery mechanism are provided with respective control switches. The switch for the actuating mechanism includes a drum 240 that is mounted on the shaft 181 for rotation therewith and has a split conductor ring 241 mounted around its periphery with the gap between its ends insulated. Three spring contact fingers 242 bear against the periphery of the drum 240, and when the actuating mechanism is at rest stand in engagement with the insulated gap portion of the ring. One of the outer fingers and the center finger are disposed in the motor circuit and the other outer finger and the center finger are disposed in circuit with the clutch control magnet 188 of the actuating mechanism. It is thus evident that when a rotation of the drum 240 has begun the contact fingers will move into engagement with the ring 241 and effect an energizing of the magnet 188 to engage the clutch of the actuating mechanism and will also effect a closing of a motor circuit which is independent of all other motor circuits and maintain such circuit closed after the coin closing circuit has been opened by a knocking out of the coin and until the actuating mechanism has completed a cycle of operations.

The control switch for the delivery mechanism includes a drum 245 and three contact fingers 246, which coact and operate at each rotation of the shaft 42 to open and close an independent motor circuit and a circuit in which the clutch operated magnet 115 is disposed, the same as described in connection with the control switch of the actuating mechanism. It is evident that when the delivery mechanism has begun a cycle of operations the independent control circuits for the motor and the magnet 115 will be closed and remain closed irrespective of the opening of other circuits until the delivery operation has been completed.

The automatic means which is operated by popped corn in the hopper 15 to disconnect the indexing and actuating mechanisms when a predetermined quantity of corn is present in the hopper and to permit a connection of said mechanism and an operation of one by the other when the quantity of corn in the hopper has been lowered a predetermined extent may be electrically controlled as illustrated in Fig. 23 or mechanically controlled as illustrated in Fig. 24.

The electrical control means shown in Fig. 23, includes a lever 250, which is fulcrumed to a bracket 251 projecting from the bottom portion of the hopper 15 at a point adjacent to and over the pawl 177 of the actuating mechanism, said lever being connected at one end to the upper end of the connecting rod 179 and at its other end to the lower end of the rod 252, which latter rod is mounted for vertical reciprocatory movements in a guide 253 projecting from an adjacent portion of the casing frame. An arm 254 projects from the upper end of the rod 252 over the hopper 15 and carries a vertically socketed member at its under side over the hopper. A plunger 256 is mounted for free reciprocatory movements on the socket of the member 255 but is limited in such movements by a pin 257 projecting through a slot therein, and the outer end of the plunger is preferably enlarged to form a broadened surface for engagement with the top of the corn disposed in the hopper. A pair of normally spaced electric contacts 258 are carried one by each of the members 255 and 256 in position to make contact when the plunger is raised with respect to its carrying member and to break contact when lowered with respect to such members. The contacts 258 are connected to the main line wires supplying current to the electrically operated parts of the machine, or may be connected to any other suitable source of electric current supply, and have an electro-magnet 259 in circuit therewith. This magnet is carried by the bracket 251 immediately above the pawl 177 so that an energizing of the magnet will raise the pawl from operative relation to the ratchet wheel 176. It is evident with this arrangement that at each upward or ratchet wheel actuating movement of the rod 179 the plunger 256 and its carrying member 255 will be lowered into the upper portion of the hopper. If the supply of corn in the hopper is sufficient for the corn to engage the bottom of the plunger 256 and stop its lowering movement the contacts 258 will be closed causing an energizing of the magnet 259 and a consequent lifting of the pawl 177 from actuating engagement with the ratchet wheel so that no movement is imparted to the indexing mechanism. If, however, the corn has lowered sufficiently in the hopper so that the plunger 256 will not be raised thereby to close the switch contacts upon a lowering movement of the plunger the magnet 259 will remain inactive and the pawl 177 permitted to impart movement to the indexing mechanism and start the popping operation as hereinbefore described.

The means shown in Fig. 24 for controlling the actuating of the indexing mechanism from the quantity of corn in the hopper includes a lever 260, which is fulcrumed to a bracket 261 extending from the lower portion of the hopper 15 above and adjacent to the pawl 177, one end of the lever being connected to the upper end of the rod 179 and the other end thereof being connected by a rod 262 to a lever 263, which has one arm extending over the hopper 15 and provided with a corn engaging head 264 disposed adjacent to the high level of corn in the hopper, the other arm of the lever 263 is connected by a rod 265 to one end of the lever 266 fulcrumed to the bracket 261 and connected at its opposite end to the pawl 177 by a link 267. With this arrangement it is preferable to hold the pawl 177 normally in engagement with the ratchet wheel 176 by a coiled contractile spring 268 attached to a convenient portion of the bracket 174. It is evident with this form of control that upon an upward movement of the rod 179 the head end of the lever 263 is lowered into the hopper, fulcruming during such movement about its connection with the rod 265. If the head end of the lever 263 when so lowering strikes and is held supported by the corn in the hopper the opposite end of the lever will be forced down, causing a rocking of the lever 266 and a consequent raising of the pawl 177 from actuating engagement with the ratchet wheel 176 so that no indexing movement is imparted to such wheel. When the corn has lowered sufficiently in the hopper 15 to permit the head end of the lever 264 to lower practically its full stroke the pawl 177 will remain in engagement with the ratchet wheel so that the pawl when actuated will impart an indexing movement to the ratchet wheel.

It is evident that I have provided means which is controlled entirely by the quantity of corn in the hopper to effect a connecting or disconnecting of the indexing mechanism and the actuating mechanism therefor, so that a starting of the popping mechanism instead of being dependent on the operating of the corn delivery mechanism will be dependent on the corn level in the hopper. When the corn in the hopper falls below a predetermined level, whether such corn is taken out through the operation of the delivery mechanism or by hand, the operation of the popping mechanism will be started and when a sufficient quantity of corn has been popped to bring the same up to a predetermined level in the hopper the popping operation will be stopped.

The part 270 which is shown on the front of the casing is a housing for a bag storage chamber, the bags being delivered from the bottom of such chamber through the chute 271 by means which forms no part of the present invention and which is therefore not shown and described.

In order to prevent the engagement of a second coin with the contact fingers 225 until a cycle of operations of the delivery mechanism has been completed, an electrically operated lock lever 275 is mounted on the coin chute 116 in position for an end thereof to be moved into coin obstructing position in the chute. An electro-magnet 276 is associated with the other end of the lever and is in circuit with the relay switch 228 so that whenever such switch is closed the magnet will be energized to move the coin obstructing end of the lever into the chute. The magnet 275 is also in circuit with the control switches 240 and 245 for the actuating mechanism and the delivery mechanism so that when the circuit of any of said switches is closed, the magnet 276 will be energized to hold the lever 275 in cam obstructing position.

The operation of the machine is as follows: Upon depositing a coin $a$ of proper denomination in the coin slot 117 the coin drops into engagement with the contacts 225 and effects a closing of the circuit in which the relay magnet 229 is disposed, and the energizing of the relay magnet causes a closing of the relay switch 228. The closing of the relay switch closes a circuit to the motor 105, a circuit to the magnet 188 of the actuating mechanism, a circuit to the magnet 115 of the delivery mechanism, and a circuit to the magnet 276, all of which circuits are connected to a suitable source of an electric current supply. The energizing of the magnet 276 actuates the lever 275 to prevent a second coin from being deposited to close the coin switch contacts 225 until the completion of a corn delivery cycle. The closing of the motor circuit causes a driving of the shaft 109, and the closing of the circuits to the magnets 115 and 188 causes a throwing of the respective clutches 110 and 185, one to cause an operating of the corn delivery mechanism and the other to cause an operating of the actuating mechanism from a rotation of the shaft 109. As soon as the operation of the delivery and actuating mechanisms has begun the switch drums 245 of one and 240 of the other turn to cause a closing of independent circuits to the motor and to all three magnets 115, 188 and 276.

As soon as the shaft 181 of the actuating mechanism begins to rotate the rod 234 is actuated through the connecting rod 231 and lever 232 to strike the arm 235 (Fig. 15) and effect an opening of the contact fingers 225 to drop the coin from engagement therewith. The dropping of the coin opens the relay switch circuit so that the running of the motor will be stopped and all of the magnets released when each of the delivery and actuating mechanisms has completed a cycle of operations. When the corn delivery mechanism is in operation the bucket 45 moves downward from the neutral or at rest position thereof shown in Fig. 3 to corn receiving relation to the discharge end of the hopper chute 27, the lower slide valve 29 of such chute being then moved to open position by the cam wheel 36 to permit the discharge of a measured quantity of corn from the chute into the bucket. The bucket is then raised by the chain 49 and when at the upper point of its movement the pinion 56 thereon engages a rack 57 causing a tipping of the bucket to discharge its contents into the corn delivery chute 59, after which the bucket moves downward to its at rest position. The corn discharged into the chute 59 rests on the gate 65 therein until the operator pushes the control lever 72 inward, which action opens both gates 65 and 61 to permit the corn to discharge from the chute 59 and nozzle 60 into a bag or other receptacle held in receiving relation to the nozzle. Immediately after the corn has been deposited in the chute 59 and while supported by the gate 65 the cam 93 acts on the butter control lever 90 causing a rocking of the butter valve arm 87 (Figs. 18 and 19) to effect an opening of the valve to discharge a predetermined quantity of butter on the corn in the chute, the discharge of butter being stopped by the closing of the valve. When the operator depresses the control lever 72 to discharge the corn from the chute 59 the valve 77 of the salt container is opened to permit a discharge of salt through the tube 71 into the nozzle 60 and thence into the bag or other corn receptacle held in receiving relation to the nozzle, the flow of salt continuing so long as the lever 72 remains depressed. After a charge of popped corn has been delivered from the hopper chute 27 the cam 36 operates to close the outer valve 29 and to open the inner valve 28 thereby permitting another charge of corn to flow into the space between the two valves. The valve 28 is then closed and remains closed until after the next opening and closing movements of the discharge valve 29. For each coin deposited in the machine, and ordinarily for each complete cycle of operations of the corn delivery mechanism, the shaft 181 of the actuating mechanism is given one complete turn and imparts a single step or indexing movement to the indexing mechanism due to the pawl and ratchet wheel connection between the shafts 181 and 172 of the actuating mechanism. At each fourth cycle of operations of the actuating mechanism a tooth on the two-toothed pinion 175 of such mechanism is brought into engagement with the feed gear 156 of the indexing switch drum 155. This movement of the gear 156 moves the drum 155 to bring a contact plate 158 thereof into contact with the switch fingers 159 thereby closing an independent motor circuit and a circuit with the magnet 138. The closing of the circuit of the magnet 138 throws the clutch 132, 133 into operation and causes a driving of the popping drum through the shaft 130 and to the connecting mechanism from the motor driven shaft 126. The rotation of the cam 151 with the shaft 130 imparts reciprocatory movements to the pawl 144 and communicates a step by step movement in counter-clockwise direction to the shaft 140 of the indexing mechanism. Immediately after the rotation of the shaft 140 is begun the insulated gap portions of the switch drums 191, 192 and 193 move out of engagement with the respective switch fingers 194 and the conductor rings on the drums then cause a closing of the respective circuits remain closed until the shaft 140 has made a complete turn. The switch drum 193 controls the circuit of the magnet 138, the drum 191 controls a circuit to the popping heater 100 and operating solenoid 104, and the drum 192 controls a circuit to the motor 105. The remaining drum 190 is in series with a circuit breaker, as hereinafter described. It is thus evident that as soon as the shaft 140 of the indexing mechanism begins to rotate a motor circuit, independent of the other motor circuits referred to, is closed to cause an operating of the motor during a complete rotation of said shaft, a current is turned into the popping heater 100 and the solenoid 104 is energized to swing the popping heater to operative position.

The closing of the magnet by the drum 193 causes the magnet 138 to remain energized during a complete rotation of the shaft 140 irrespective of the opening of the initial energizing circuit of said magnet by a movement of an insulated or gap portion of the indexing drum 155 into register with the switch fingers 159. Substantially simultaneous with a starting of the shaft 140 the cam 200 on said shaft effects an actuation of the rod 204 to operate the valves 6 and 7 in the unpopped corn chute 5 to discharge a measured quantity of unpopped corn into the popping drum 4 from said chute. At each rotation of the drum 4 during a popping operation the popped kernels fall onto the partition 13 and are directed thereby through a discharge opening 14 in an end of the drum and thence into the hopper 15, while the unpopped kernels pass through the partition 13 to the outer screen drum. When the shaft 140 has nearly completed a rotation the drum switch 192 is opened permitting a dropping of the heater to inoperative position and a turning off of its circuit, and the switch drums 192 and 191 remain in closed circuit a short distance longer due to the shortening of their insulated gap portions relative to that of the drum 190, thereby causing the magnet 138 to remain energized and the motor to continue to run until the shaft has practically completed its turn. During the interval between the opening of the popping heater circuit and the opening of the circuit to the motor and the magnet 138, the cam 200 acts to effect a lowering of the rod 204 and a consequent moving of the valves 6 and 7 to first close the latter and then to move the former to permit a quantity of unpopped corn to flow down into the space in the chute 5 between the two valves. At the same time the movement of the valve operating means causes a movement of the deflecting plate 16 of the drum to the dotted line position shown in Fig. 7 so that as the drum revolves the unpopped kernels which remain therein are directed into the trough 17 and discharged thereby through an end opening in the drum into the tubes 19 and 21 by which they are directed into the receptacle 20. The reversing tooth 167 revolves with the shaft 140 and at a predetermined point in its revolution, or during the passage of the roll 169 through the cam-way 170, is moved into engagement with the switch drum gear 157 and causes a turning of the gear and drum with the shaft 140, or backward with respect to the previous drum movement, a distance corresponding to the distance which the drum was moved forward by the pinion 175, thus returning the drum to off position and opening the circuits which were closed by the engagement of the switch fingers 159 with one of the drum plates 158. This completes a cycle of operations of all of the mechanisms of the machine after a coin has been deposited in the coin chute. If, however, more than four coins have been successively deposited in the machine during a popping operation, which is determined by a complete rotation of the shaft 140, the actuating pinion 175 will again operate to advance the drum 158, and if such advancing takes place before the drum has been reversed by the action of the tooth 167 the drum will be moved to off position, and if it takes place after the reversing action of the tooth 167 the drum will be again moved to on position so that the popping operations are continued for a second cycle after the completion of the first cycle of operations or of the rotation of the shaft 140.

If the second forward indexing movement of the drum 158 takes place before the reversing action of the tooth 167 the drum will be moved to off position by the forward indexing movement of the pinion 175 and the reversing action which takes place thereafter will again move the drum to on position so that the popping will be continued for another cycle.

During the first popping cycle the parts are cold and more time is allowed for such cycle than for a cycle of operations immediately following. This is taken care of by the pawl 144 having a shorter stroke during the first popping cycle, and at the end of such cycle and throughout the immediate continuing cycle having a much longer stroke. To accomplish this a cam 213 on the shaft 140, when near the end of a complete rotation of a shaft 140 depresses the rod 214 sufficiently for the catch 216 to engage a notch in such rod and retain it in such position. The rod carries a lever 219 which, when the rod is raised coacts with a stop member on the pawl actuating means to limit the stroke of the pawl and is then moved to inoperative position by a depression of the rod 214 to permit a full stroke of the pawl. The rod 214 remains in this depressed position until the magnet 138 is deenergized when the armature thereof which carries the catch 216 is permitted to move outward and cause a release of the catch from engagement with the rod 214, thereby permitting the check lever 219 to raise again to operative position. The stroke of the pawl during the second and succeeding continuous popping cycles is adjusted by the stop screw 221.

In addition to the indexing mechanism being controlled and actuated by the depositing of each fourth coin in the coin chute it is also automatically controlled by the height of popped corn in the storage hopper 15, that is, the popping will be automatically discontinued when the corn in the hopper has been raised to a predetermined level therein, notwithstanding the continued depositing of coins in the coin chute so long as the maximum level is substantially maintained. When the corn level in the hopper has fallen below normal level and a coin is then deposited in the machine the popping will continue for a desired number of popping cycles necessary to return the corn to normal level. This is accomplished by either mechanically or electrically moving the pawl 177 of the actuating mechanism to inoperative position and retaining it in such position so long as the corn is at substantially normal level and permiting the pawl to engage its ratchet wheel when the corn falls down below such level. This means is in reality a safety device to prevent an overflowing of the popper 15 by the popping of more corn that is delivered by the depositing of coins in the machine. For instance, one popping operation will pop considerably more corn than is delivered from the machine by four delivery operations. This enables corn to be taken from the hopper both by hand and by the delivery means and insures an ultimate bringing up of the corn level to normal height by the normal operation of the machine occasioned by the depositing of coins therein.

As a safety means to take care of abnormal conditions in various parts of the machine I have provided a circuit breaker in the main current supply line and this breaker is connected with different operating parts so that an abnormal condition in any of such parts will throw the breaker and stop the machine. For instance, should the magnet 138 burn out for any reason while the heater current is on, the lever 134 will be thrown by the spring releasing action of the clutch 132, 133 and cause a contact finger 285 thereon to move into engagement with a contact 286, which contacts are in circuit with the circuit breaker 287 in the main current supply line. The circuit-breaker switch 285, 286 is in series with the indexing mechanism drum switch 190, 194 so that a releasing of the circuit breaker can only occur when the switch drum 190 is in circuit closing position, which takes place when the shaft 140 is turning during a popping operation. As soon as the circuit breaker is released the deenergizing of the solenoid 104 by the opening of the circuit breaker permits the heater 100 to drop down from operative relation to the popping drum 4 so that any corn which is in the popper when the circuit breaker is opened will not be burned to the drum screening due to the radiant heat from the heater before the latter has cooled off. It will be understood in this connection that as soon as the circuit breaker is opened all operating parts of the machine are stopped so that the drum 4 then remains stationary.

Another circuit breaker operating circuit is disposed in connection with the delivery mechanism control switch 245, 246 so that should the clutch 110 stick for any reason and prevent a throwing out of the same at the end of a delivery cycle the circuit breaker will be opened. This is accomplished by providing a switch in connection with the switch drum 245, the drum contact member 290 of which is secured to an end of the drum and immediately after the starting of a rotation of the drum from neutral position makes contact with and closes a circuit between a pair of switch fingers 291 (Fig. 3). The fingers 191 are in circuit with the contacts 292 (Fig. 25) of an auxiliary switch which is associated with the relay switch 228 and are automatically opened when the relay switch is closed and vice versa. With this arrangement the delivery mechanism can make one complete cycle of movements, but if it continues to make a second cycle by reason of the clutch sticking, and without placing another coin in the machine, the breaker circuit will be completed through the auxiliary switch 292, which then stands closed, and through the switch 290, 291, causing a stop of the operating parts.

Another breaker circuit is connected to the switch drum 240 of the actuating mechanism so that should such mechanism for any reason continue to operate after the completion of a cycle of operations, and before another coin has been placed in the machine, the circuit breaker will be energized to open the main operating circuit. For this purpose a contact 293 is provided on an end of the drum 240 and closes the connection between a pair of contact fingers 294 which are also in circuit with the auxiliary switch 292 (Fig. 25). It is thus evident that if the drum 240 continues to rotate after one cycle of operations and before a second coin has been p'aced in the machine, or when the relay switch 228 is open and the auxiliary switch 292 closed, the circuit breaker will be operated to open the circuit.

It sometimes happens that a coin becomes burned into adherence to the contact fingers 225 so that it will not drop from engagement therewith and open the coin switch when the fingers 225 are opened. In such event the relay switch 228 will remain closed and when the switch drum 240 has reached a predetermined point in its revolution, which shou'd occur after the period of releasing of a coin from the coin switch, a connection will be closed between a finger 295 (Fig. 22) and one of the fingers 294 by a conductor-finger 296 on the drum 240 (Figs. 22 and 25), said fingers being in circuit with the circuit breaker 287 and with a contact part 228ª of the relay switch.

Upon depositing a coin into contact with the fingers 225 the circuit 300 is closed energizing the magnet 229, this closing the circuit 301 to the motor, the circuit 302 to the magnet 188, in the actuating mechanism, a circuit 303 to the magnet 115 in the delivering mechanism, and a circuit 304 between finger 228ª and finger 295. The purpose of this circuit 304 as hereinbefore explained is to close a circuit 305 to the circuit breaker 287, thru the mediums of a circuit 306 operated by switch drum 240, thru finger 295 and one of the fingers 294, and a conductor finger 296, (Figs. 22-25) whenever a coin is by accident burned into contact in the fingers 225. If this control were not provided, this condition would as before explained cause a continuous running of the machine.

The delivering and actuating mechanism will now operate by reason of the closing of circuit 300, until the coin is released from contact in the fingers 225, by the releasing mechanism hereinbefore explained. As the coin is released before one complete delivery and actuating cycle, I have for the actuating cycle, provided a circuit 307 between the switch drum 240 and the motor, and a circuit 308 between the switch drum 240 and the clutch control magnet 188 of the actuating mechanism. It is thus evident that an actuating operation will be continued thru to the completion of one cycle, or until the fingers 242 again reach an insulated position on the insulated gap portion of the drum 240. For the delivery operation and to complete same thru one cycle, after the coin is released, I have provided a circuit 309 closed by the fingers 246, coacting on the drum 245, to the motor and a circuit 310 also closed by the fingers 246 and drum 245 to the clutch operating magnet 115. It is thus evident that when the delivery mechanism has begun a cycle of operations the independent control circuits for the motor and the magnet 115 will be closed and remain closed irrespective of other circuits, until the delivery operation has been completed.

A circuit 311 is provided to the circuit breaker 287 from the fingers 291 contacting with contacts 290, so that if a delivery operation should continue to operate abnormally without a coin in contact with fingers 225, the circuit breaker will be energized, breaking the current supply. This by reason of circuit 311 being affected by contacts 292 being closed upon a said abnormal operation as hereinbefore disclosed.

To prevent an abnormal operation or continued running of the actuating mechanism for any reason after completion of a cycle of operations, the circuit breaker will be energized to open the main source of current supply. To accomplish this a circuit 312 is closed by contact 293, on the drum 240 and fingers 294, this circuit 312 being also in contact with the auxiliary switch 292. It is thus evident that if drum 240 continues to rotate after one cycle of operations and before a second coin has been placed in the machine, or when the relay switch 228 is open, and the auxiliary switch 292 closed, the circuit breaker will be operated to open the circuit.

Upon the depositing of each fourth coin and the subsequent four operations of the actuating mechanism, one tooth of the two toothed pinion 175 is brought into engagement with the feed gear 156 of the indexing switch drum 155. This movement of gear 156 moves the drum 155 to bring the contact plate 158 thereof into contact with the switch fingers 159, thereby closing an independent circuit 313 to the motor, and a circuit 314 to the magnet 138. This energizing of the magnet 138 and starting of the motor produces a popping cycle as hereinbefore disclosed, and these popping cycles will continue to follow one another so long as fingers 159 are in contact on the plate 158 of the drum 155, all as hereinbefore explained.

During the period of rotation of the drum 155 by the shaft 140, the switch drums 190, 191, 192 and 193 being fixed to the shaft 140 are also rotated as hereinbefore explained. The circuits controlled by these said drums are as follows.

The switch drum 193 with its fingers 194 closes a circuit 315 to the magnet 138, which circuit keeps magnet energized until a popping cycle is completed, after circuit 314 is broken by a return of drum 155 to its off contact position.

The switch drum 192 closes a circuit 316 to the popping heater 100 and a circuit 317 to the heater elevating solenoid 104.

The switch drum 191 controls a circuit 317ª to the motor, thereby causing a continuation of the running of the motor after circuit 313 is broken by reason of a returning of the drum 155 to off contact position.

The remaining drum 190 is in series with the circuit breaker thru a contact 286 and the finger 285, so that if the magnet 138 burns out during a popping operation a circuit 318 will be closed to the circuit breaker, this cutting the current supply and preventing the damage that would result otherwise. The detailed construction and timing of these various switch drums has all been described and disclosed hereinbefore.

To prevent the corn in the hopper 15 from reaching an abnormal high level, the electrical control to disengage the pawl 177 of the indexing mechanism has been provided. Upon a closing of the switch points 255 by reason of an abnormal level of corn in the hopper the circuit 318 is closed, this energizing the magnet 259 and this thereby raising the pawl and preventing same from operating the drum 155. Popping operations are therefore discontinued until sufficient corn has been removed from the hopper to provide room for additional. The mechanical operation of this control is completely disclosed hereinbefore.

Heater circuits 319 and 320 are provided to close circuits to the heaters 27ª, this warming the supply of corn disposed internal of the hopper. These circuits 319 and 320 are connected to the source of current supply thru a four pole switch 321, so that a high or low heat may be obtained, as by a turning of the switch to one contact position the two heaters are in series, and upon a turning of the switch to another position each heater receives an independent supply of current. This method of wiring two heating elements is a standard construction of the art of electrical wiring and in use on a great many heater installations, so that further detail need not be gone into.

A circuit 322 is used to supply current to the element 98 disposed on the chute 59, and the element 95 in the butter container 82. A switch 323 is carried in this circuit so that said elements may be cut out at will.

A circuit 324 is utilized to light the electric lights which may be mounted in the case 1 and this circuit is passed thru a switch 325 so that the lights may be cut off or on at will.

All of the hereinbefore circuits are tied to and connected with the line wires 326, and it is evident that all circuits are affected by a cutting out of the circuit breaker.

This method of arranging multiple circuits is one standard in electrical wiring procedure. In Fig. 25, a type of control is shown where one wire is used to carry more than one circuit, as for instance the many circuits that go to the operating motor. These forms of arranging electrical circuits are all fully understood by those conversant with the art of electrical wiring, and each individual circuit may be easily traced on the Fig. 25 from the operating point of its application to the line wires 326.

I wish it understood that the particular machine and the different parts thereof illustrated and described are merely a typical embodiment of one form of my invention, and that the specific construction described herein is merely by way of illustration and not by limitation or narrowing of my claims, as obviously, a great many changes in construction and design can be made without departing from my invention, and obviously, also, various of the features described can be omitted leaving the machine still operative to usefully do certain of the work described and such changes are contemplated by me and would not involve any departure from my invention.

Having thus described my invention, what I claim as new, and desire to secure by Letters Patent, is,—

1. In a machine of the class described, a motor, a drum in normally released clutch controlled connection with the motor, a magnet adapted when energized to throw the clutch of said connection to engaged position, an indexing mechanism having an index switch and a master switch, means operable by the motor to periodically move the indexing switch in one direction to close a circuit to said magnet, and means operable by the motor when the magnet operated clutch is in engaged position to operate the indexing mechanism to move the master switch to close the magnet circuit and after a predetermined period to open said circuit and also operable to move the indexing switch to off position after the master switch circuit has been closed.

2. In a machine of the class described, a motor, a popping drum, a normally released clutch controlled connection between the motor and drum, an electro-magnet operable when energized to effect an engagement of the clutch of said mechanism, an electric heater associated with the drum, an indexing switch in circuit with the magnet, a master switch in circuit with the heater, coin controlled means driven by the motor for moving the indexing switch to close the magnet circuit, and means operated by the motor when the drum is in operation for moving the master switch to close the heater circuit.

3. In a machine of the class described, a motor, a popping drum, a normally released clutch controlled connection between the motor and drum, an electro-magnet operable when energized to effect an engagement of the clutch of said mechanism, an electric heater associated with the drum, an indexing switch in circuit with the magnet, a master switch in circuit with the heater, coin controlled means driven by the motor for moving the indexing switch to close the magnet circuit, means operated by the motor when the drum is in operation for moving the master switch to close the heater circuit, and means operable by the master switch operating means for moving the indexing switch to off position at a predetermined period in a cycle of operation.

4. In a machine of the class described, an electric motor, a popping drum, an electric heater in association therewith, a magnetically controlled driving connection between the motor and drum, an indexing switch in circuit with the motor and the magnetically controlled connection, a master switch in circuit with the motor, the magnetically controlled connection and the heater, an actuating mechanism in magnetically controlled connection with the motor and operable when driven to effect a movement of the indexing switch to close a motor circuit and an operating circuit for the magnet of the drum driving connection, means operable by the drum driving connection when the drum is being driven to move the master switch to close its circuits and to move the index switch to open its circuits and electrically operating coin controlled means for closing a starting circuit of the motor and the driving connection between the motor and actuating mechanism.

5. In a machine of the class described, a motor, a popping drum, an electric heater in association with the drum, a normally disconnected magnetically controlled driving connection between the motor and drum, a plurality of control switches having rotary portions and mechanism operable by the depositing of a coin in the machine to operate one of said switches by the motor to close the circuit to the control magnet of said first connection to cause a driving of the drum from the motor and then operable by the driving action of said connection to operate another switch to close the heater circuit.

6. In a machine of the class described, an electric motor, a popping drum, an electric heater in connection with the drum, a magnetically controlled driving connection between the motor and drum, a switch operable to open and close the control circuit for said connection, mechanism in coin-controlled connection with the motor and operable upon the depositing of certain coins of a series in the machine to alternately move the switch to open and close the magnet circuit, and mechanism operable by the motor when the drum is being driven to impart a periodical reverse movement to the switch to that imparted by the coin-controlled mechanism to throw the switch to off position if previously moved to on position by the coin-controlled mechanism, and vice versa, and also operable to effect a closing of the heater circuit for a predetermined period.

7. In a machine of the class described, a popping drum, a movable heater in association with the drum, and mechanism controlled by the depositing of a coin in the machine and operable to effect a driving of the drum for a predetermined period and a periodical movement of the heater.

8. In a machine of the class described, a popping drum, magnetically controlled means for driving the drum, a switch in circuit with the magnet of the control means, coin-controlled mechanism operable upon the depositing of a certain coin in the machine to impart a predetermined movement to the switch in one direction to close the magnet circuit, and mechanism automatically operable after the magnet circuit is closed and at a predetermined point in a cycle of popping operations to move the switch in the reverse direction to open the magnet circuit.

9. In a machine of the class described, a popping drum, an electric heater in association with the drum, magnetically controlled means for driving the drum, a switch in circuit with the magnet of the control means, coin-controlled mechanism operable upon the depositing of a certain coin in the machine to impart a predetermined movement to the switch in one direction to close the magnet circuit, mechanism automatically operable after the magnet circuit is closed and at a predetermined point in a cycle of popping operations to move the switch in the reverse direction to open the magnet circuit, and also operable to periodically open and close the heater circuit during the popping cycle.

10. In a machine of the class described, a popping drum, an electric heater in association with the drum, magnetically controlled means for driving the drum, a rotary switch in circuit with the magnet of the control means and having successive on and off positions, coin-controlled mechanism operable by the depositing of coins in the machine to impart intermittent movements in one direction to the switch to successively place it in on and off positions, and mechanism automatically operable by the drum driving means to close a heater circuit and an independent movement to the switch to turn it to off position and after a predetermined popping period effecting an opening of the second magnet circuit and the heater circuit.

11. In a machine of the class described, a popping drum, an electric heater in association with the drum, an electric motor, magnetically controlled means for driving the drum from the motor, a switch in circuit with the magnet of the control means, coin-controlled mechanism operable upon the depositing of a certain coin in the machine to close a motor circuit and said switch, and mechanism automatically operable after the closing of the switch to close the popping circuit and independent circuits to the motor and to the magnet of the control means and then to open the switch and at a predetermined period thereafter to open the motor, the magnet and the heater circuits.

12. In a machine of the class described, a popping drum, a movable heater associated with the drum, means operable to drive the drum, an electric control switch for said means, coin-controlled mechanism operable to close the switch to start a driving of the drum, and means operable by the first means, when driving the drum, to move the heater to operative position to close the heater circuit.

13. In a machine of the class described, a popping drum, an electric heater associated with the drum, means operable to drive the drum, a control magnet for said means, coin-controlled means operable to close the magnet circuit to start a driving of the drum, and mechanism operable by said means, when driving the drum, to close the heater circuit and a second magnet circuit and then to open the first magnet circuit and subsequently, after a predetermined popping period, opening the second magnet circuit and the heater circuit.

14. In a machine of the class described, an electric motor, a popping drum, driving connection between the motor and drum having a magnetic control, an indexing switch in circuit with the motor and with the magnetic control of said first means, a master switch in circuit with the heater, the motor and the magnetic control, an actuating mechanism in clutch controlled connection with the motor and having a control magnet therein, a coin switch in circuit with the motor and the magnet of said mechanism to adapt it, when closed, to cause a running of the motor and an energizing of the magnet to cause a movement of the indexing switch to close its circuits, and mechanism operable by a running of the drum driving means to close the circuits of the master switch and then to move the indexing switch to open its circuits and after a predetermined period to cause an opening of all of the master switch circuits.

15. In a machine of the class described, a popping drum, an electric heater movable into and out of operative heating relation to the drum, and means operable to close the heater circuit and move it to operative heating relation to the drum.

16. In a machine of the class described, a popping drum, an electric heater movable into and out of heating relation to the drum, and coin controlled means operable to close the heater circuit and move the heater to operative heating relation to the drum.

17. In a machine of the class described, a popping drum, an electric heater normally standing out of heating relation to the drum, magnetic means operable, when energized, to move the heater to operative relation to the drum, and means operable to close the heater circuit and energize the magnetic means and after a predetermined period to open the circuits to the heater and magnetic means.

18. In a machine of the class described, a popping drum, an electric heater normally standing in inoperative relation to the drum, electrical means operable, when energized, to move the heater to operative relation to the drum, a normally open switch in circuit with the heater and electrical means, and mechanism operable to close the switch for a predetermined period and then to open the same.

19. In a machine of the class described, a popping drum, electrically controlled means for driving the drum, an electric heater for the drum normally standing in inoperative relation thereto, electrical means operable, when energized, to move the drum to operative position, switch means in circuit with the heater and the electrical control means therefor, an electrical coin control for the drum driving means, and mechanism operable, after the starting of the driving of the drum and substantially continuous with the drum driving operation, to move the switch means first to on position and then after a predetermined period to off position.

20. In a machine of the class described, corn popping means, a coin controlled mechanism operable to effect an operation of the popping means, a storage receptacle for receiving popped corn from the popping means, and means automatically operable to render said mechanism inoperative when the corn is at or above a predetermined height in the receptacle.

21. In a machine of the class described, a popping means, an electrical control for the popping means, a storage receptacle for receiving popped corn from the popping means, mechanism operable to close the operating circuit of the electric control to start a popping operation of the popping means, and means automatically operable by the corn in the receptacle when at or above a predetermined height therein to prevent a circuit closing operation of said mechanism.

22. In a machine of the class described, a popping means, an electrical control for the popping means, a storage receptacle for receiving popped corn from the popping means, coin controlled mechanism operable to periodically open and close the circuit of the electrical control, and means automatically operable by the corn in the receptacle when at or above a predetermined height therein to prevent a circuit closing operation of said mechanism.

23. In a machine of the class described, a movable corn popping container, an electric heater associated therewith, a normally idle drive means for the container, mechanism operable to act on the drive means to cause a driving of the container, a storage receptacle for receiving popped corn from the container, and means automatically operable by the corn in the receptacle when at or above a predetermined height therein to prevent an operation of the mechanism to cause the means to drive the container.

24. In a machine of the class described, a corn popping means, coin controlled mechanism operable to start a popping operation of said means, a receptacle for receiving popped corn from the popping means, and means automatically operable by the corn in the receptacle when at or above a predetermined height therein to render the mechanism inoperative with respect to the popping means.

25. In a machine of the class described, a corn popping means, coin controlled mechanism operable to start a popping operation of the means and including a pawl and ratchet drive intermediate parts thereof, a storage receptacle for receiving popped corn from the popping means, and means connected to the pawl and automatically operated by corn in the receptacle when at or above a predetermined height therein to move the pawl to render the mechanism inoperative with respect to the popping means.

26. In a machine of the class described, a popping drum, an electric heater associated therewith, independently rotatable indexing and master switch drums, the master drum being in circuit with the heater, a control for the popping drum in circuit with the indexing drum, a motor, coin-controlled mechanism normally disconnected from the motor and operable thereby to periodically move the indexing drum in one direction to close the control circuit, mechanism operable upon a closing of the control circuit to rotate the master switch drum to close the heater circuit and a circuit to the control means and thereafter to impart a predetermined reverse movement to the indexing drum and at the end of a predetermined popping period to move the master switch to off position.

27. In a machine of the class described, a popping drum, an electric heater associated therewith, independently rotatable indexing and master switch drums, the master drum being in circuit with the heater, a control for the popping drum in circuit with the indexing drum, an electric motor, coin-controlled mechanism normally disconnected from the motor and operable thereby to periodically move the indexing drum in one direction to close the control circuit, mechanism operable upon a closing of the control circuit to rotate the master switch drum to close the heater circuit and a circuit to the control means and thereafter to impart a predetermined reverse movement to the indexing drum and at the end of a predetermined popping period to move the master switch to off position, and means rendering the indexing drum driving mechanism inoperative during a reverse driving of the drum by the second mechanism.

28. In a machine of the class described, a popping drum, means operable to introduce a charge of unpopped corn into the hopper, an electrically controlled driving means for the drum, an electric motor, and coin-controlled means normally disconnected from the motor and automatically operable thereby to cause a driving of the drum for a corn popping operation, and mechanism operable by the drum driving means to operate the first means to introduce a charge of corn into the popping drum and to close the heater circuit and at the end of the popping operation to open the heater circuit and stop the drum driving operation.

29. In a machine of the class described, a popping drum, a motor for driving the popping drum, an indexing mechanism operable to control the driving of the popping drum, an actuating mechanism normally in inoperative connection between the motor and indexing mechanism, magnetic means operable to close the driving connection of said actuating mechanism, a coin switch in circuit with the motor and with the magnet of said last means and closed by the placing of a coin in contact therewith to effect a starting of the motor and actuating mechanism, means operable by the actuating mechanism to close separate circuits with the motor and magnet means, and means operable by the actuating mechanism after a closing of said second circuit to release a coin from closing engagement with the coin switch.

30. In a machine of the class described, a popping drum, an electric heater associated with the drum, means operable to rotate the drum and close the heater circuit during a predetermined portion of a popping cycle, and to maintain such circuit closed a predetermined period and then automatically operable to shorten the period during which the heater circuit remains closed for successive popping operations.

31. In a machine of the class described, a popping means mechanism for imparting a cycle of operations to the popping means at one speed and automatically operable to change the speed of the popping operations for succeeding continuous popping cycles.

32. In a machine of the class described, a popping drum, means for operating the drum for successive popping cycles, an electric heater associated with the drum, a switch in circuit with said heater, and mechanism operable to maintain the switch closed for a predetermined period during a popping cycle of the drum and to maintain the switch closed for a shorter period for each succeeding popping cycle continuously following the first popping cycle.

33. In a machine of the class described, a corn popping means including a rotatable drum and an electric heater, coin-controlled mechanism operable to impart a plurality of popping cycles to the popping means, a switch in circuit with the heater, and means operable to maintain the switch closed a predetermined period during the first popping cycle of the popping means and to maintain the switch closed for a shorter period for each continuously following popping cycle of the popping means.

34. In a machine of the class described, a popping means including a rotatable popping drum and an electric heater, coin-controlled means for driving the drum for continuous popping cycles of the popping means, a rotary switch operable, when rotated, to intermittently close and open the heater circuit of the popping means, and means automatically operable to rotate the switch during popping cycles at one speed for the first popping cycle and at a faster speed for continuous succeeding popping cycles.

35. In a machine of the class described, a popping means including a rotary popping drum and an electric heater, means operable to drive the drum for continuous popping cycles, a switch in circuit with the heater and movable to periodically close and open the switch for each popping cycle, and means operable by the drum driving means when driving the drum to actuate said switch and cause it to remain closed for one period during the first popping cycle of the popping means and for a shorter period for each continuously following popping cycle of the popping means.

36. In a machine of the class described, a popping drum, an electric heater in association therewith, and means operable to close the heater circuit for one period during a popping cycle and to close the heater circuit for a shorter period for each continuously following popping cycle.

37. In a machine of the class described, an electric corn-popping heater, a rotary switch in circuit with the heater, means including a pawl and ratchet operable to impart rotation to the switch to maintain the heater circuit closed a predetermined period and then automatically operable to change the stroke of the pawl to vary the length of the next heating period of the heater.

38. In a machine of the class described, an electric popping heater, a rotary switch in circuit with the heater and adapted, when rotated, to successively open and close the circuit, and means operable to impart a predetermined rotation to the switch at one speed and a continuous predetermined rotation thereof at a different speed to vary the heating periods of the heater.

39. In a machine of the class described, a popping drum, an electric heater therefor, means operable to introduce measured quantities of unpopped corn into the drum, rotatable means operable to actuate the first means to introduce a charge of corn into the drum and to intermittently open and close the heater circuit for each popping cycle, and mechanism operable to drive said rotatable means at one speed during one popping cycle and at a different speed for continuously following popping cycles.

40. In a machine of the class described, a popping drum, an electric heater associated therewith, means for introducing measured quantities of corn into the drum, coin-controlled means for operating the drum for each popping cycle, a control means for the unpopped charge introducing means and the heater, and mechanism operable by the drum operating means to move said control means at one speed during one popping cycle of the drum and to move it at a different speed for continuously succeeding popping cycles of the drum.

41. In a machine of the class described, an electric popping heater, a rotatable switch for the heater operable to periodically turn the heater circuit on and off, a rotatable member, means operable by the rotating member to impart feeding movements to the switch, and means coacting with said feeding means to limit the feeding movements thereof for a predetermined period and then to permit an increase in the feeding movements to vary the speed of movement of the switch.

42. In a machine of the class described, an electric popping heater, electrical means for moving the heater into and out of operative position, a control means for the heater circuit and electrical means, and means operable to move the control means at one speed for a predetermined period and then to change the speed of movement thereof.

43. In a machine of the class described, an electric popping heater, electrical means for moving the heater into and out of operative position, a rotatable member, a rotatable control means for the circuits of the heater and the electric control means, and pawl and ratchet means operable by a rotation of the member to impart feeding movements to the control means at one speed for a predetermined period and then to change the speed of the feeding movements.

44. In a machine of the class described, an electric popping heater, electrical means operable to move the heater into and out of operative position, a rotatable switch for controlling the electrical circuits of the heater and the electrical means, a rotatable cam, means including a pawl and ratchet operable by a rotation of the cam to impart successive feeding movements to the switch, and means for limiting the throw of the pawl and ratchet means during a predetermined period of operation and then operable to permit a longer throw of such means.

45. In a machine of the class described, a supply chute, a delivery chute, an endless chain guided for vertical flights of movement, said chain having a projection thereon, a frame guided for vertical movements at a side of the chain and engaged by the chain projection to raise the frame when the projection is raised and to support the frame during a lowering movement of the projection, a bucket tiltably carried by the frame and movable therewith to receiving relation to the supply chute and then into dumping relation to the discharge chute, means for tilting the bucket to discharge its contents into the discharge chute when at a predetermined point in its movement, and means operable to drive the chain throughout a cycle of delivery operations and then to stop the same.

46. In a machine of the class described, a supply chute, a delivery chute, an endless chain guided for vertical flights of movement, said chain having a projection thereon, a frame guided for vertical movements at a side of the chain and engaged by the chain projection to raise the frame when the projection is raised and to support the frame during a lowering movement of the projection, a bucket tiltably carried by the frame and movable therewith to receiving relation to the supply chute and then into dumping relation to the discharge chute, means for tilting the bucket to discharge its contents into the discharge chute when at a predetermined point in its movement, and coin-controlled means operable to impart a cycle of movements to the chain to deliver a bucket of material from the supply chute to the delivery chute.

47. In a machine of the class described, a popped corn delivery mechanism, a popping drum, an electric motor, a driving connection between the motor and delivery mechanism, a driving connection between the motor and popping drum, a separate normally released magnetic control clutch in each driving connection, an electric switch in circuit with the motor and with the control clutch magnet of the delivery mechanism whereby a closing of the switch starts the motor and engages said clutch, and means operable by a running of the motor to close the magnet circuit of the other clutch to start a driving of the popping drum and also to open the first motor circuit and close another motor circuit.

48. In a machine of the class described, a popped corn delivery mechanism, an electric motor in driving connection with said mechanism having two circuits, a manually controlled switch in one circuit operable to start the motor, and an automatic switch in the other circuit operable by the delivery mechanism to close the second motor circuit at a predetermined point in a cycle of operations of the delivery mechanism.

49. In a machine of the class described, a popped corn delivery mechanism, an electric motor in driving connection with the mechanism and having two circuits, a coin-controlled switch in one circuit adapted to be closed by a coin to start a running of the motor, a switch automatically operable to close the other circuit at a predetermined point in a cycle of operations of the delivery mechanism, and means operable by a running of the motor to effect an opening of the first circuit after a closing of the second circuit.

50. In a machine of the class described, a popped corn delivery mechanism, an electric motor in driving connection with the mechanism and having an operating circuit, a circuit breaker in the circuit, means for closing the circuit to cause a running of the motor and a driving of the delivery mechanism, and a switch in circuit with the circuit breaker and automatically operable to close its circuit if a driving of the delivery mechanism continues after it has completed a cycle of operations.

51. In a machine of the class described, an electric motor, a popping mechanism having an electric heater, means actuated by a running of the motor to periodically close and open the heater circuit, a circuit breaker in the motor and heater circuits, and means automatically operable to open the circuit breaker if the motor and heater circuits remain closed longer than a predetermined period.

In testimony whereof, I have hereunto subscribed my name to this specification.

GEORGE H. HARTMAN.